United States Patent
Huang et al.

(10) Patent No.: US 10,698,994 B2
(45) Date of Patent: Jun. 30, 2020

(54) FINGERPRINT SENSOR PIXEL ARRAY AND METHODS OF FORMING SAME

(71) Applicant: Taiwan Semiconductor Manufacturing Company, Ltd., Hsinchu (TW)

(72) Inventors: Yu-Chih Huang, Hsinchu (TW); Chih-Hsuan Tai, Taipei (TW); Yu-Jen Cheng, New Taipei (TW); Chih-Hua Chen, Zhubei (TW); Yu-Feng Chen, Hsinchu (TW); Hao-Yi Tsai, Hsinchu (TW); Chung-Shi Liu, Hsinchu (TW); Chen-Hua Yu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 16/221,933

(22) Filed: Dec. 17, 2018

(65) Prior Publication Data
US 2019/0121952 A1 Apr. 25, 2019

Related U.S. Application Data

(60) Continuation of application No. 15/903,128, filed on Feb. 23, 2018, now Pat. No. 10,157,274, which is a (Continued)

(51) Int. Cl.
*G06F 21/32* (2013.01)
*H01L 23/00* (2006.01)
(Continued)

(52) U.S. Cl.
CPC .......... *G06F 21/32* (2013.01); *G06K 9/0002* (2013.01); *H01L 21/486* (2013.01);
(Continued)

(58) Field of Classification Search
None
See application file for complete search history.

(56) References Cited

U.S. PATENT DOCUMENTS

| 5,956,415 A * | 9/1999 | McCalley | G06F 3/044 382/124 |
| 7,259,055 B2 | 8/2007 | Li et al. | |

(Continued)

FOREIGN PATENT DOCUMENTS

| CN | 101127331 A | 2/2008 |
| CN | 101211903 A | 7/2008 |

(Continued)

*Primary Examiner* — Khaja Ahmad
(74) *Attorney, Agent, or Firm* — Slater Matsil, LLP

(57) ABSTRACT

A device package includes a sensor die, one or more additional dies adjacent the sensor die, and a molding compound encircling the sensor die and the one or more additional dies. The device package further includes redistribution layers over the sensor die, the one or more additional dies, and the molding compound. The redistribution layers include first conductive features in a first dielectric layer. The first conductive features electrically connect the sensor die to the one or more additional dies. The redistribution layers further include an array of electrodes in a second dielectric layer over the first dielectric layer and electrically connected to the sensor die.

19 Claims, 26 Drawing Sheets

Related U.S. Application Data division of application No. 15/200,871, filed on Jul. 1, 2016, now Pat. No. 9,904,776.

(60) Provisional application No. 62/293,732, filed on Feb. 10, 2016.

(51) Int. Cl.

| | | |
|---|---|---|
| *H01L 23/31* | (2006.01) | |
| *H01L 21/56* | (2006.01) | |
| *H01L 21/683* | (2006.01) | |
| *H01L 23/58* | (2006.01) | |
| *G06K 9/00* | (2006.01) | |
| *H01L 21/48* | (2006.01) | |
| *H01L 23/538* | (2006.01) | |
| *H01L 25/065* | (2006.01) | |
| *H01L 25/00* | (2006.01) | |

(52) U.S. Cl.
CPC ...... *H01L 21/4853* (2013.01); *H01L 21/4857* (2013.01); *H01L 21/565* (2013.01); *H01L 21/566* (2013.01); *H01L 21/6835* (2013.01); *H01L 23/3114* (2013.01); *H01L 23/3121* (2013.01); *H01L 23/3128* (2013.01); *H01L 23/5383* (2013.01); *H01L 23/5384* (2013.01); *H01L 23/5386* (2013.01); *H01L 23/5389* (2013.01); *H01L 23/585* (2013.01); *H01L 24/19* (2013.01); *H01L 24/20* (2013.01); *H01L 25/0655* (2013.01); *H01L 25/50* (2013.01); *H01L 21/56* (2013.01); *H01L 21/568* (2013.01); *H01L 21/6836* (2013.01); *H01L 2221/68318* (2013.01); *H01L 2221/68327* (2013.01); *H01L 2221/68359* (2013.01); *H01L 2221/68372* (2013.01); *H01L 2221/68381* (2013.01); *H01L 2224/04105* (2013.01); *H01L 2224/12105* (2013.01); *H01L 2224/16227* (2013.01); *H01L 2224/24137* (2013.01); *H01L 2224/32225* (2013.01); *H01L 2224/73204* (2013.01); *H01L 2224/73267* (2013.01); *H01L 2224/92244* (2013.01); *H01L 2924/141* (2013.01); *H01L 2924/143* (2013.01); *H01L 2924/1431* (2013.01); *H01L 2924/1434* (2013.01); *H01L 2924/1438* (2013.01); *H01L 2924/15311* (2013.01); *H01L 2924/19107* (2013.01)

(56) References Cited

U.S. PATENT DOCUMENTS

| | | | |
|---|---|---|---|
| 7,521,292 | B2 | 4/2009 | Rogers et al. |
| 8,361,842 | B2 | 1/2013 | Yu et al. |
| 8,680,647 | B2 | 3/2014 | Yu et al. |
| 8,703,542 | B2 | 4/2014 | Lin et al. |
| 8,759,964 | B2 | 6/2014 | Pu et al. |
| 8,778,738 | B1 | 7/2014 | Lin et al. |
| 8,785,299 | B2 | 7/2014 | Mao et al. |
| 8,803,306 | B1 | 8/2014 | Yu et al. |
| 8,809,996 | B2 | 8/2014 | Chen et al. |
| 8,829,676 | B2 | 9/2014 | Yu et al. |
| 8,877,554 | B2 | 11/2014 | Tsai et al. |
| 2004/0099918 | A1 | 5/2004 | Noguchi et al. |
| 2006/0203403 | A1 | 9/2006 | Schediwy et al. |
| 2008/0042292 | A1 | 2/2008 | Adkisson et al. |
| 2008/0157341 | A1 | 7/2008 | Yang et al. |
| 2008/0179762 | A1 | 7/2008 | Cho et al. |
| 2011/0068427 | A1 | 3/2011 | Paek et al. |
| 2011/0291288 | A1 | 12/2011 | Wu et al. |
| 2013/0026468 | A1 | 1/2013 | Yoshimuta et al. |
| 2013/0062760 | A1 | 3/2013 | Hung et al. |
| 2013/0062761 | A1 | 3/2013 | Lin et al. |
| 2013/0168848 | A1 | 7/2013 | Lin et al. |
| 2013/0307140 | A1 | 11/2013 | Huang et al. |
| 2014/0015131 | A1 | 1/2014 | Meyer et al. |
| 2014/0103943 | A1 | 4/2014 | Dunlap et al. |
| 2014/0138788 | A1 | 5/2014 | Kim et al. |
| 2014/0171158 | A1 | 6/2014 | Setlak et al. |
| 2014/0203429 | A1 | 7/2014 | Yu et al. |
| 2014/0225222 | A1 | 8/2014 | Yu et al. |
| 2014/0252646 | A1 | 9/2014 | Hung et al. |
| 2014/0264930 | A1 | 9/2014 | Yu et al. |
| 2014/0367160 | A1 | 12/2014 | Yu et al. |
| 2015/0187707 | A1 | 7/2015 | Lee et al. |
| 2015/0294135 | A1* | 10/2015 | Kim .................. H01L 23/04 382/124 |
| 2016/0210496 | A1 | 7/2016 | Lin et al. |
| 2016/0260695 | A1 | 9/2016 | Chung et al. |
| 2016/0350572 | A1* | 12/2016 | Kim .................. G06K 9/0002 |

FOREIGN PATENT DOCUMENTS

| | | |
|---|---|---|
| CN | 102544032 A | 7/2012 |
| JP | 2008166821 A | 7/2008 |
| KR | 102140065723 A | 5/2014 |
| KR | 1020140052539 A | 5/2014 |
| TW | 1229373 B | 3/2005 |
| TW | 1397111 B | 5/2013 |
| TW | 201428639 A | 7/2014 |

\* cited by examiner

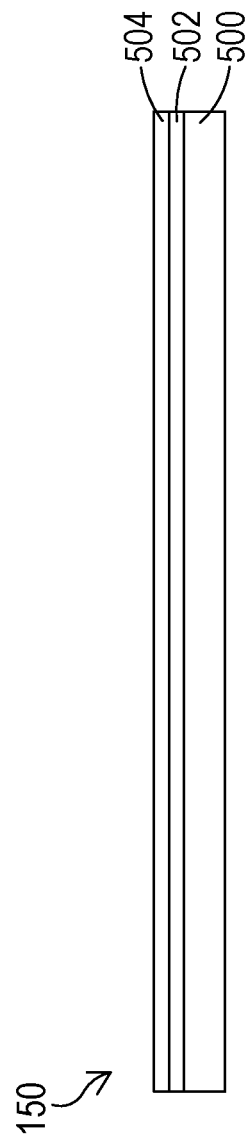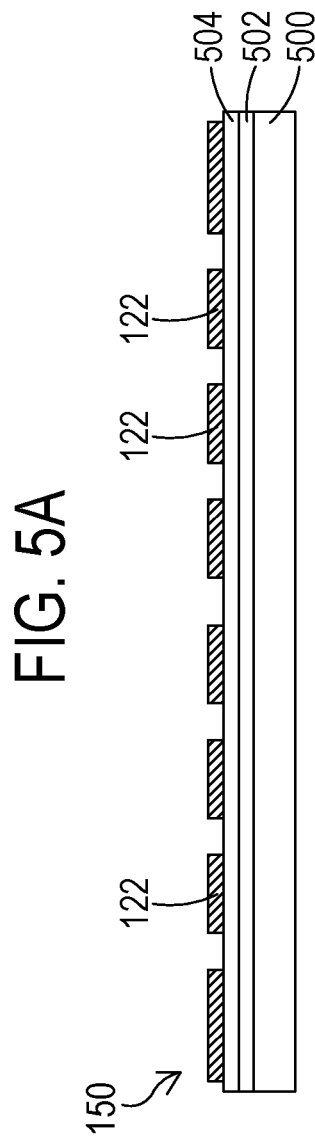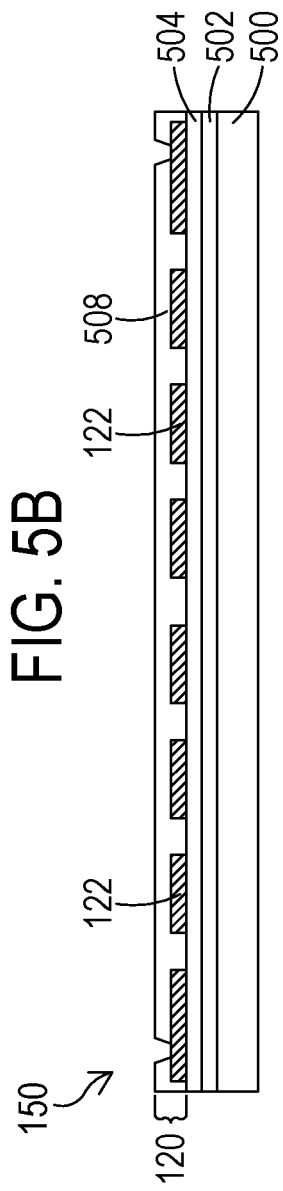

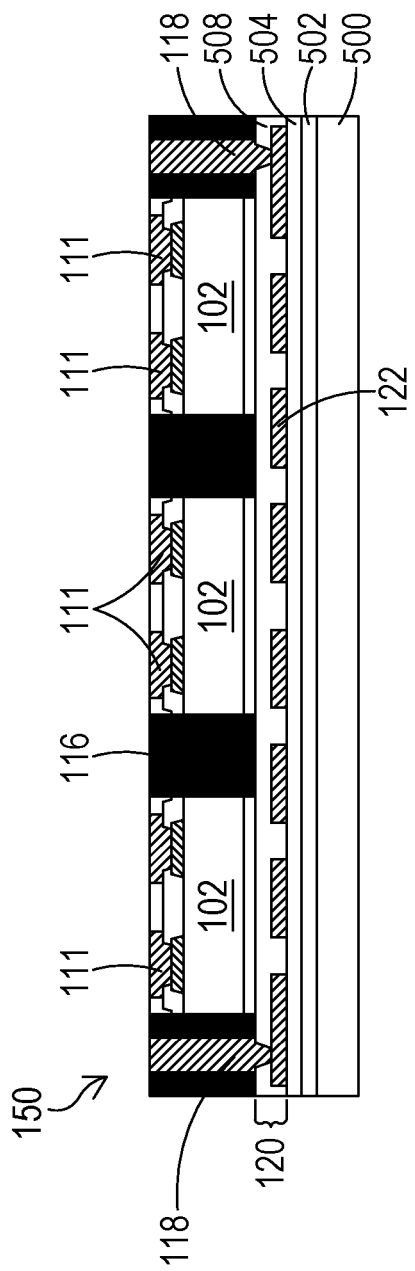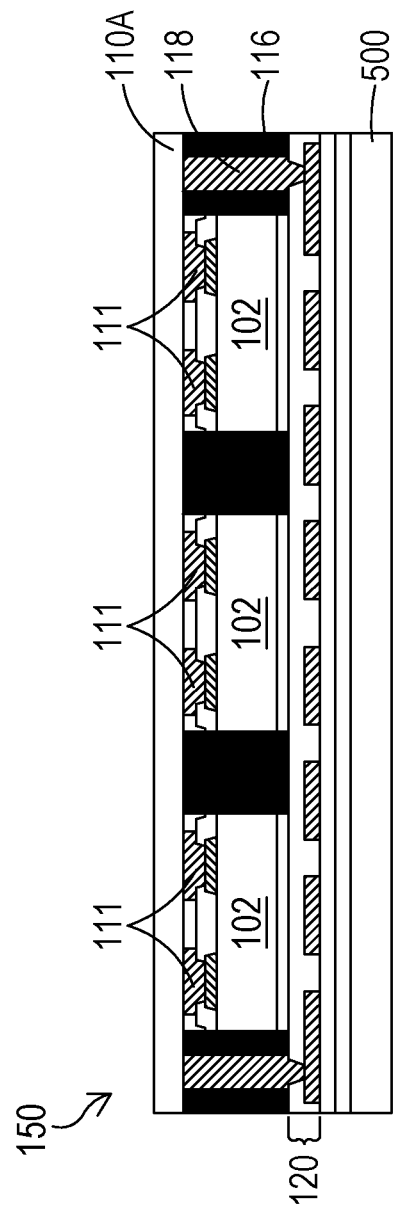

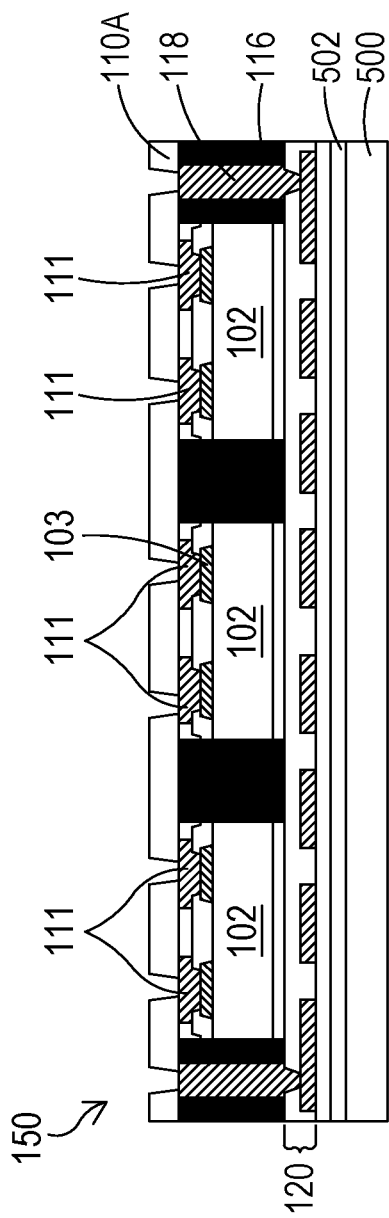
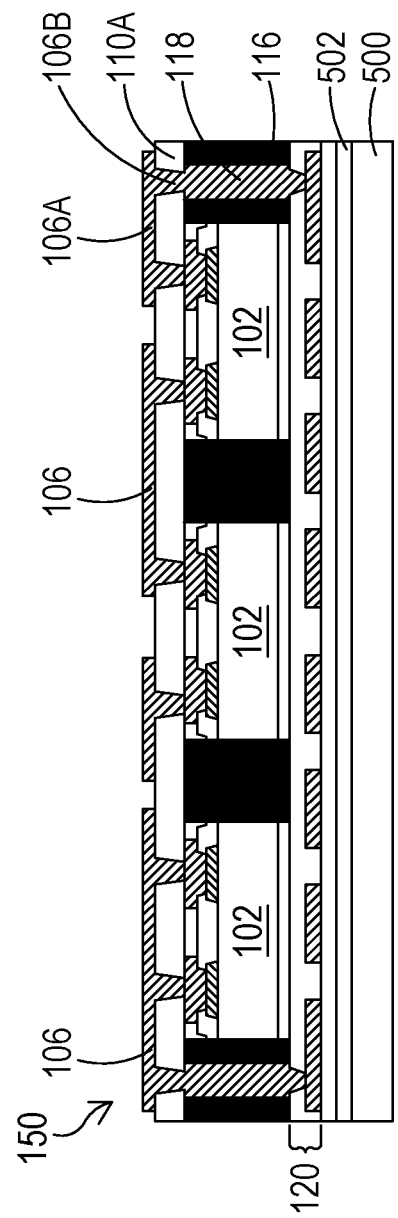
FIG. 5H
FIG. 5I

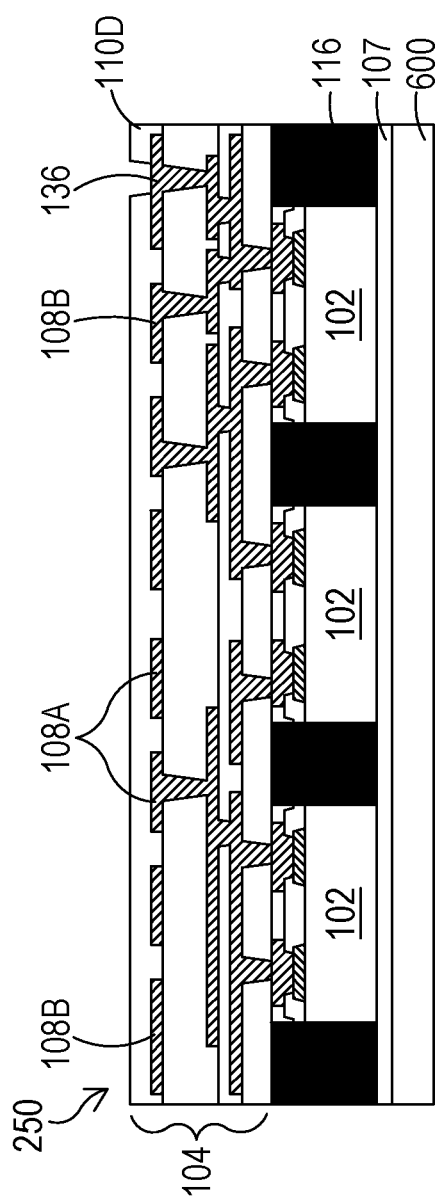
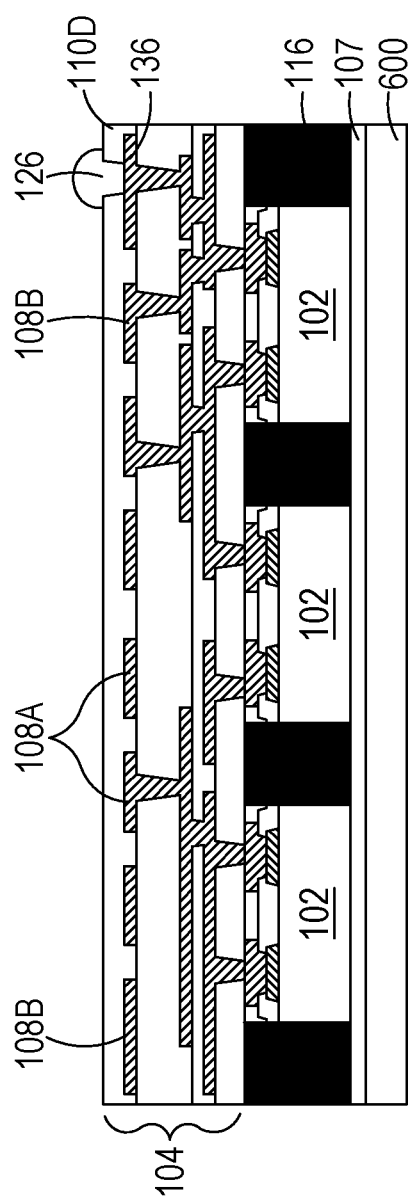

FINGERPRINT SENSOR PIXEL ARRAY AND METHODS OF FORMING SAME

PRIORITY CLAIM AND CROSS-REFERENCE

This application is a continuation application of U.S. application Ser. No. 15/903,128, filed on Feb. 23, 2018, entitled "Fingerprint Sensor Pixel Array and Methods of Forming Same," now U.S. Pat. No. 10,157,274, which is a divisional application of U.S. application Ser. No. 15/200,871, filed on Jul. 1, 2016, entitled "Fingerprint Sensor Pixel Array and Methods of Forming Same," now U.S. Pat. No. 9,904,776, which claims the benefits of U.S. Provisional Application Ser. No. 62/293,732, filed on Feb. 10, 2016, entitled "Standalone Sensor Pixel Array of Fingerprint Module in InFO Structures", each application is hereby incorporated herein by reference in its entirety.

BACKGROUND

As user devices become smaller and more portable, it has become easier for people with ill intentions to steal user devices. When such devices bear sensitive information of the user, thieves may be able to access such information unless barriers have been placed into the user device. Once such barrier is a fingerprint sensor which can be used to read the fingerprint of the person attempting to access the device and, if the fingerprint is not the same fingerprint of the user, access may be denied.

However, as user devices such as cell phones become smaller, there is a pressure on each of the individual components within the user device to also see a concurrent reduction in size. As such, there is a pressure to reduce the size of the fingerprint package that contains the fingerprint sensor without seeing a reduction in performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A through 6G illustrate cross-sectional views of intermediary stages of manufacturing a fingerprint sensor device package according to some other embodiments.

DETAILED DESCRIPTION

Figure 1A:
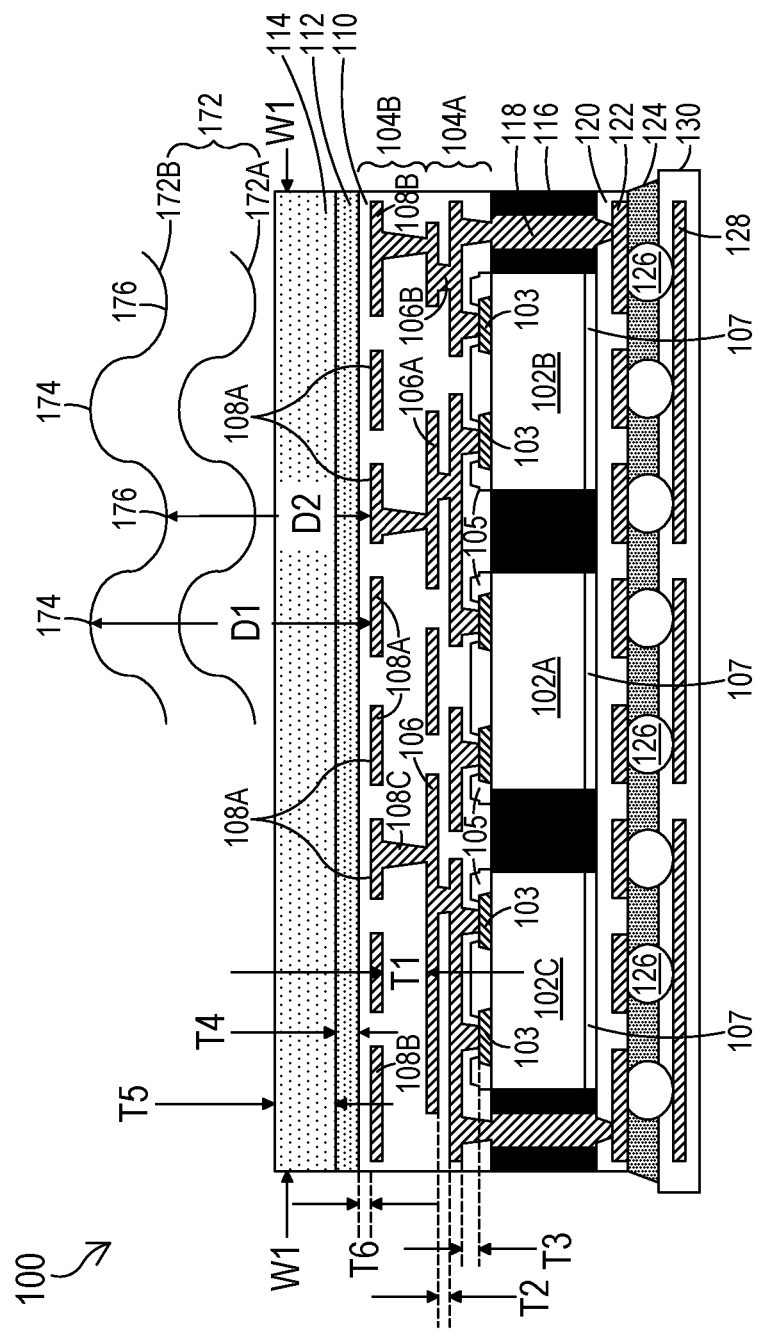
FIGS. 1A and 1B illustrate cross-sectional views of a fingerprint sensor device package according to some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will now be described with respect to a fingerprint sensor in a system in package solution or an integrated fan out (InFO) structure. However, embodiments may be used any suitable device, such as devices with pixel arrays.

Referring first to FIG. 1A, a cross-sectional view of an embodiment fingerprint sensor device package 100 is illustrated. Package 100 may be used to determine contours 172 of an overlaying finger for biometric identification and/or verification. In an embodiment, package 100 is integrated as part of device (e.g., a cellular phone, a tablet device, a laptop computer, a desktop computer, a smart card, an internet of things (IoT) device, or any other device where biometric sensing is desired), and package 100 may optionally be used to compare contours 172 of an overlaying finger with a stored fingerprint image and determine whether access to the device is authorized. For example, when package 100 is integrated as part of a cellular phone, package 100 may be located at an exterior surface of the cellular phone to verify a user and unlock the phone based on fingerprint verification.

Package 100 includes a sensor die 102A, a high voltage (HV) die 102B, and a microcontroller die 102C. Sensor die 102A includes logic circuitry to determine contours 172 of a finger applied to package 100 and output the contours 172 of the finger to microcontroller die 102C. For example, a user may apply a finger to a sensor surface material 114, and sensor die 102A may determine the contours 172 of a finger from capacitance and/or voltage variations detected by an array of electrodes 108A. Thus, sensor die 102A may also be referred to as a fingerprint sensor die, which takes electrical signals from the array of electrodes to sense a fingerprint of a finger applied to package 100. A finger drive ring 108B may further be used to increase the accuracy and/or sensitivity of fingerprint detection. A more detailed description of the operations of sensor 102A, the array of electrodes 108A, and finger drive ring 108B is provided below. In various embodiments, the array of electrodes 108A and finger drive ring 108B may be disposed in fan-out redistribution layers (RDLs) 104 formed over dies 102 as described in greater detail below.

HV die 102B is designed and connected in order to supply a high voltage, such as between about 5 V and about 50 V, such as about 33 V, to sensor die 102A in order to amplify the sensitivity of sensor die 102A. For example, by integrating HV die 102B with sensor die 102A such that a high voltage can be supplied to sensor die 102A, the sensitivity of sensor die 102A may be increased ten times by raising the input voltage to 33 V from, e.g., 3.3 V.

Microcontroller die 102C is designed and connected in order to receive the measured contours 172 of the applied finger (e.g., from sensor die 102A) and determine whether the measured contours 172 match stored fingerprint(s). For example, microcontroller die 102C includes a microcontroller unit (MCU) for comparing fingerprints and flash memory for storing authorized fingerprint(s). In an embodiment, microcontroller die 102C determines whether to authorize access to a device integrating package 100 based on a comparison between sensed finger contours 172 and a stored, authorized fingerprint. By including microcontroller die 102C within the fingerprint sensing package 100, improved security can be achieved. For example, fingerprint sensing package 100 does not need to transmit the measured contours 172 of an applied finger to an outside chip for authentication, which reduces the risk of the hacked transmissions and improper access to the device.

Although referred to as a single "die," microcontroller die 102C may be an integrated die (e.g., having both logic and memory circuitry) or separate, electrically connected dies (e.g., having separately deployed logic and/or memory circuits). In other embodiments, package 100 may include other dies, including, processor, logic circuitry, memory, analog circuit, digital circuit, mixed signal, and the like dies. Furthermore, either or both HV die 102B and microcontroller die 102C may be omitted and/or replaced with other dies in other embodiment packages.

Each die 102A, 102B, and 102C (referred to collectively as dies 102) may be a semiconductor die and may include a substrate, active devices, and an interconnect structure (not individually illustrated). The substrates of dies 102 may comprise, for example, bulk silicon, doped or undoped, or an active layer of a semiconductor-on-insulator (SOI) substrate. Generally, an SOI substrate comprises a layer of a semiconductor material, such as silicon, formed on an insulator layer. The insulator layer may be, for example, a buried oxide (BOX) layer or a silicon oxide layer. The insulator layer is provided on a substrate, such as a silicon or glass substrate. Alternatively, the substrate may include another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used.

Active devices such as transistors, capacitors, resistors, diodes, photo-diodes, fuses, and the like may be formed at the top surface of the substrates. Interconnect structures may be formed over the active devices and the substrates. The interconnect structures may include inter-layer dielectric (ILD) and/or inter-metal dielectric (IMD) layers containing conductive features (e.g., conductive lines and vias comprising copper, aluminum, tungsten, combinations thereof, and the like) formed using any suitable method. The ILD and IMD layers may include low-k dielectric materials having k values, for example, lower than about 4.0 or even 2.0 disposed between such conductive features. In some embodiments, the ILD and IMD layers may be made of, for example, phosphosilicate glass (PSG), borophosphosilicate glass (BPSG), fluorosilicate glass (FSG), $SiO_xC_y$, Spin-On-Glass, Spin-On-Polymers, silicon carbon material, compounds thereof, composites thereof, combinations thereof, or the like, formed by any suitable method, such as spinning, chemical vapor deposition (CVD), and plasma-enhanced CVD (PECVD). The interconnect structures electrically connect various active devices to form functional circuits within dies 102. The functions provided by such circuits may include memory structures, processing structures, sensors, amplifiers, power distribution, input/output circuitry, or the like. One of ordinary skill in the art will appreciate that the above examples are provided for illustrative purposes only to further explain applications various embodiments and are not meant to limit the embodiments in any manner. Other circuitry may be used as appropriate for a given application.

I/O and passivation features may be formed over the interconnect structure of each die 102. For example, contact pads 103 may be formed over the interconnect structure and may be electrically connected to the active devices through the various conductive features in the interconnect structure. Contact pads 103 may comprise a conductive material such as aluminum, copper, and the like. Furthermore, passivation layers 105 may be formed over the interconnect structures and contact pads 103. In some embodiments, passivation layers 105 may be formed of non-organic materials such as silicon oxide, un-doped silicate glass, silicon oxynitride, and the like. Other suitable passivation materials may also be used. Portions of the passivation layers may cover edge portions of contact pads 103.

Figure 1B:
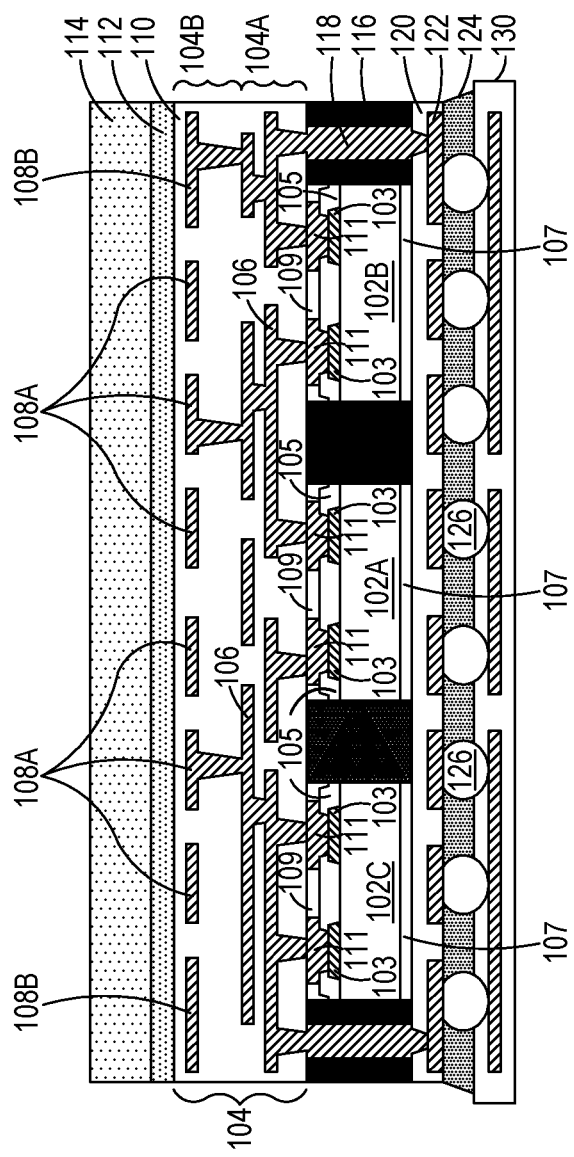

Additional interconnect features, such as additional passivation layers, conductive pillars, and/or under bump metallurgy (UBM) layers, may also be optionally formed over contact pads 103. For example, FIG. 1B illustrates an embodiment package 150 where dies 102 (sensor die 102A, HV die 102B, and microcontroller die 102C) further include contact pillars 111 over and electrically connected to contact pads 102. A protective layer, such as a dielectric material 109 may be formed around contact pillars 111.

The various features of dies 102 may be formed by any suitable method and are not described in further detail herein. Furthermore, the general features and configuration of dies 102 described above are but one example embodiment, and dies 102 may include any combination of any number of the above features as well as other features.

Referring back to FIG. 1A, a molding compound 116 is disposed around and encircles dies 102A, 102B, and 102C. In embodiments, molding compound 116 comprises an epoxy, a resin, a moldable polymer such as polybenzoxazole (PBO), a molded underfill (MUF), or another moldable material. Molding compound 116 may be formed around dies 102A, 102B, and 102C using any suitable process, such as compression molding or exposed molding. As explained in greater detail below, compression molding may generally be used when dies 102 comprise conductive pillars 111 over contact pad 103 (see FIG. 1B) whereas exposed molding is used when conductive features in fan-out RDLs 104 directly connect to contact pads 103 of dies 102 (see FIG. 1A). In embodiments where an exposed molding process is used, a top surface of molding compound 116 may be substantially level with or lower than top surfaces of dies 102 (see FIG. 1A). In embodiments where molding compound 116 is formed using a compressive molding process, a top surface of molding compound 116 is substantially level with top surfaces of conductive pillars 111 disposed on dies 102 (see FIG. 1B). As used herein, the term "substantially" is used to account for deviations in mathematical precision due to production variations during manufacturing processes.

Fan-out RDLs 104 are disposed over dies 102 and molding compound 116. RDLs 104 may extend laterally past edges of dies 102 over a top surface of molding compound 116. RDLs 104 may include conductive features 106 and 108 formed in multiple dielectric layers 110. Dielectric layers 110 may be formed of any suitable material (e.g., polyimide (PI), polybenzoxazole (PBO), benzocyclobuten (BCB), epoxy, silicone, acrylates, nano-filled pheno resin, siloxane, a fluorinated polymer, polynorbornene, a nitride such as silicon nitride; an oxide such as silicon oxide, phosphosilicate glass (PSG), borosilicate glass (BSG), boron-doped phosphosilicate glass (BPSG), or the like). Dielectric layer 110 may be formed by any acceptable deposition process, such as spin coating, chemical vapor deposition (CVD), laminating, the like, or a combination thereof.

Conductive features 106 (e.g., conductive lines 106A and/or vias 106B) may be formed in dielectric layers 110. Conductive features 106 are disposed in lower layers 104B of RDLs 104. Lower layers 104B are used to describe layers of RDLs 104 closest to dies 102. In some embodiments, conductive features are used as electrical routing to transmit signals between sensor die 102A, HV die 102B, and microcontroller die 102C. Conductive features 106 may further electrically connect dies 102 to conductive through-vias 118, which extend through molding compound 116. Conductive through-vias 118 provide electrical connection between conductive features in fan-out RDLs 104 and conductive features 122 in backside RDLs 120.

In the embodiments of FIGS. 1A and 1B, solder balls 126 (or other suitable connectors) are disposed conductive features 122 in order to bond and electrically connect package 100 to conductive features 128 in another package component 130. In various embodiments package component 130 may be another device die, an interposer, a package substrate, a printed circuit board, a mother board, or the like. An underfill 124 may optionally be disposed around solder balls 126 for structural support.

RDLs 104 may further include an array of electrodes 108A and a finger drive ring 108B in dielectric layers 110. The array of electrodes 108A and the finger drive ring 108B are electrically connected to dies 102 by way of conductive vias 108C and conductive features 106. Finger drive ring 108B may encircle the array of electrodes 108A (see e.g., FIG. 3A), and in some embodiments finger drive ring 108B may also be used as a seal ring to protect features in RDLs 104 from outside contaminants. However, unlike seal rings which are electrically isolated, finger drive ring 108B is electrically connected to sensor die 102B and (optionally) additional dies in package 100.

The array of electrodes 108A and the finger drive ring 108B are disposed in upper layers 104B of RDLs 104. Upper layers 104B are disposed over lower layers 104A, and upper layers 104B may be used to describe layers of RDLs 104 farther from dies 102 and closer to a finger having contours 172 applied to package 100. In some embodiments, the array of electrodes 108A and finger drive ring 108B are disposed in an upper-most layer of RDLs 104 to reduce the distance between the array of electrodes 108A/finger drive ring 108B and an applied finger. It has been observed that by reducing this distance, contours 172 can be determined with increased sensitivity. In FIG. 1A, distance T6 is defined as a distance between a top surface of polymer layers 110 and top surfaces of the array of electrodes 108A/finger drive ring 108B. In some embodiments, distance T6 is between about 1 μm to about 5 μm.

Sensor die 102A is electrically connected to the array of electrodes 108A and finger drive ring 108B (e.g., using conductive features 106 and conductive vias 108C). Contours 172 of an applied finger may be determined by sensor die 102A using effective capacitors formed between the finger and the array of electrodes 108B. For example, the finger may act as top plates of the effective capacitors, and the array of electrodes 108B may act as bottom plates of the effective capacitors. Sensor die 102A (sometimes referred to as a fingerprint sensor die) may use the electrical signals generated by the array of electrodes 108A to determine controus 172 of the applied finger.

In some embodiments, sensor die 102A (sometimes also referred to as a fingerprint sensor die) uses a direct capacitive approach to determine contours 172 of the applied finger. For example, valleys 174 and ridges 176 of the finger may correspond to effective capacitors having different capacitances. By measuring capacitive changes in the array of electrodes 108A, contours 172 of the finger may be determined. However, the direct capacitive approach generally assumes dielectric permittivity of the effective capacitors is the same as air. Thus, a direct capacitive approach may suffer from interference caused by dead skin cells (e.g., represented by line 172A), sweat, and other impurities between the dermis (e.g., represented by line 172B) and the array of electrodes 108A.

Therefore, in embodiments desiring improved sensitivity and accuracy, sensor die 102A (sometimes also referred to as a fingerprint sensor die) may use an active capacitance approach (also referred to as a radio frequency (RF) approach) to detect contours 172 of the applied finger. In the RF approach, finger drive ring 108B is used to apply an RF voltage to the dermis of the finger prior to measurements taking place. The application of voltage charges the effective capacitors formed between the dermis and the array of electrodes 108A. An electric field is generated between the finger and the array of electrodes, and the electric field follows contours 172 in the dermis of the finger. On a discharge cycle, the voltage across the dermis and the array of electrodes 108A is compared against a reference voltage in order to calculate capacitance. The distance values (e.g., distances D1 and D2) are then calculated mathematically according to the formula $$\Delta U = q \frac{V}{D1}(D1 - D2), U = qV$$

where U stands for potential energy, q stands for charge, and V stands for electrical potential (e.g., voltage). An advantage of the RF approach is that distance values are directly calculated, and impurities may not significantly interfere with such measurements. Thus, finger drive ring 108B provides a mechanism to determine a fingerprint with improved sensitivity and accuracy.

As further illustrated by FIG. 1A, the array of electrodes 108A and finger drive ring 108B may be spaced farther apart from conductive features 106. For example, a vertical distance between the array of electrodes 108A/finger drive ring 108B and a nearest layer of conductive features 106 to the array of electrodes 108A/finger drive ring 108B is denoted as distance T1. A vertical distance between conductive features 106 in different layers is denoted as distance T2. A vertical distance of between dies 102 and a nearest layer of conductive feature 106 to dies 102 is denoted as distance T3. In some embodiments, distances T2 and T3 are both smaller than distance T1. Distances T2 and T3 may be equal or different. For example, in some embodiments distances T2 and T3 are about 2 μm to about 11 μm whereas distance T1 is about 3 μm to about 15 μm. It has been observed that by spacing the array of electrodes 108A/finger drive ring 108B farther away from conductive features 106, signal interference may be advantageously reduced in RDLs 104.

Returning now to FIG. 1A, a sensor surface material 114 is adhered to a top surface of fan-out RDLs 104 with the assistance of a glue layer 112. In an embodiment the glue layer 112 is a color film or adhesive glue, such as an epoxy resin, a phenol resin, acrylic rubber, silica filler, or a combination thereof. However, any other suitable material may be utilized. In an embodiment, glue layer 112 may be applied to have a thickness T4 of between about 2 μm and about 20 μm, such as about 10 μm.

Sensor surface material 114 is placed in contact with glue layer 112 and is used to separate the array of pixels 108A from an overlying finger. In an embodiment, sensor surface material 114 is a material such as sapphire or glass that allows for the measurement of capacitive and/or voltage changes between the array of pixels 108A and an overlying finger to determine contours 172 of the finger. In an embodiment, sensor surface material 114 may have a width W1 of between about 5 mm and about 15 mm, such as about 10 mm, which is large enough to adequately accommodate a finger so that a fingerprint image can be taken. Additionally, the sensor surface material 114 may have a thickness T5 of between about 50 μm and about 1000 μm, such as about 100 μm.

Figure 2A:
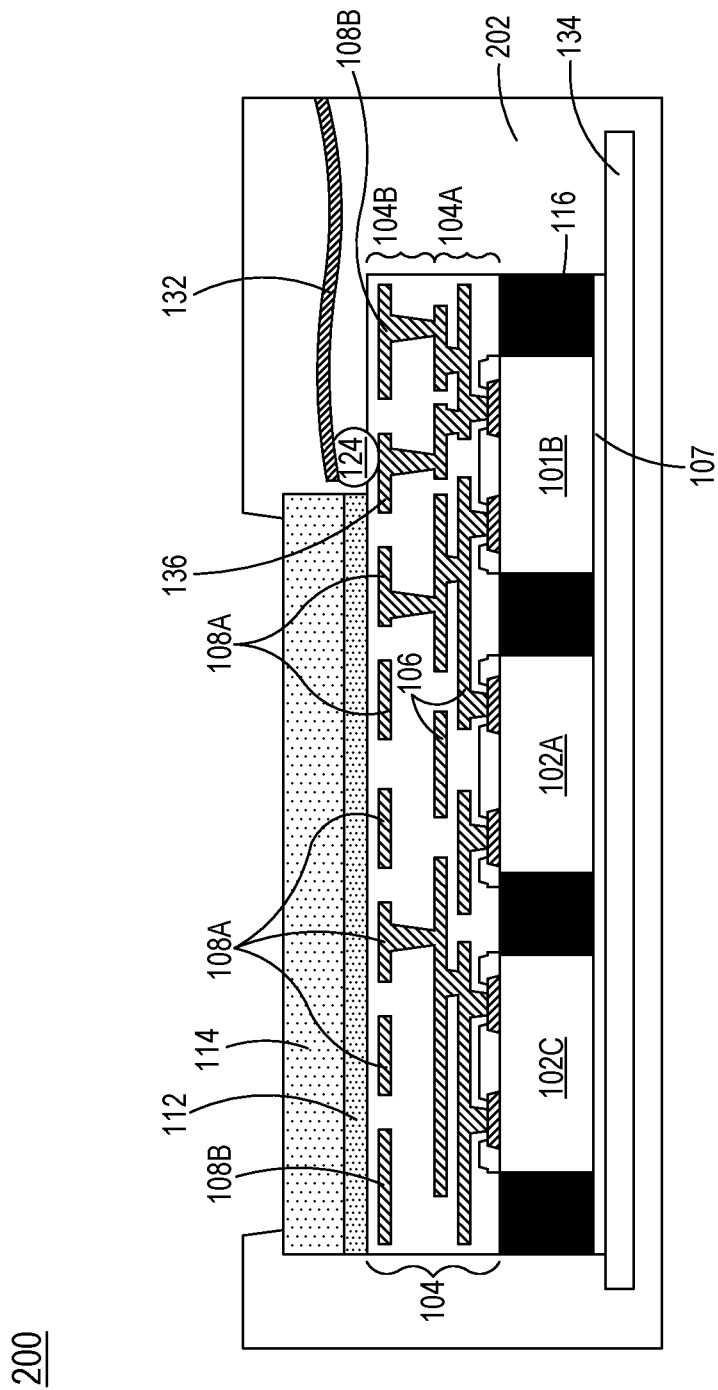
FIGS. 2A and 2B illustrate cross-sectional views of a fingerprint sensor device package according to some other embodiments.
Figure 2B:
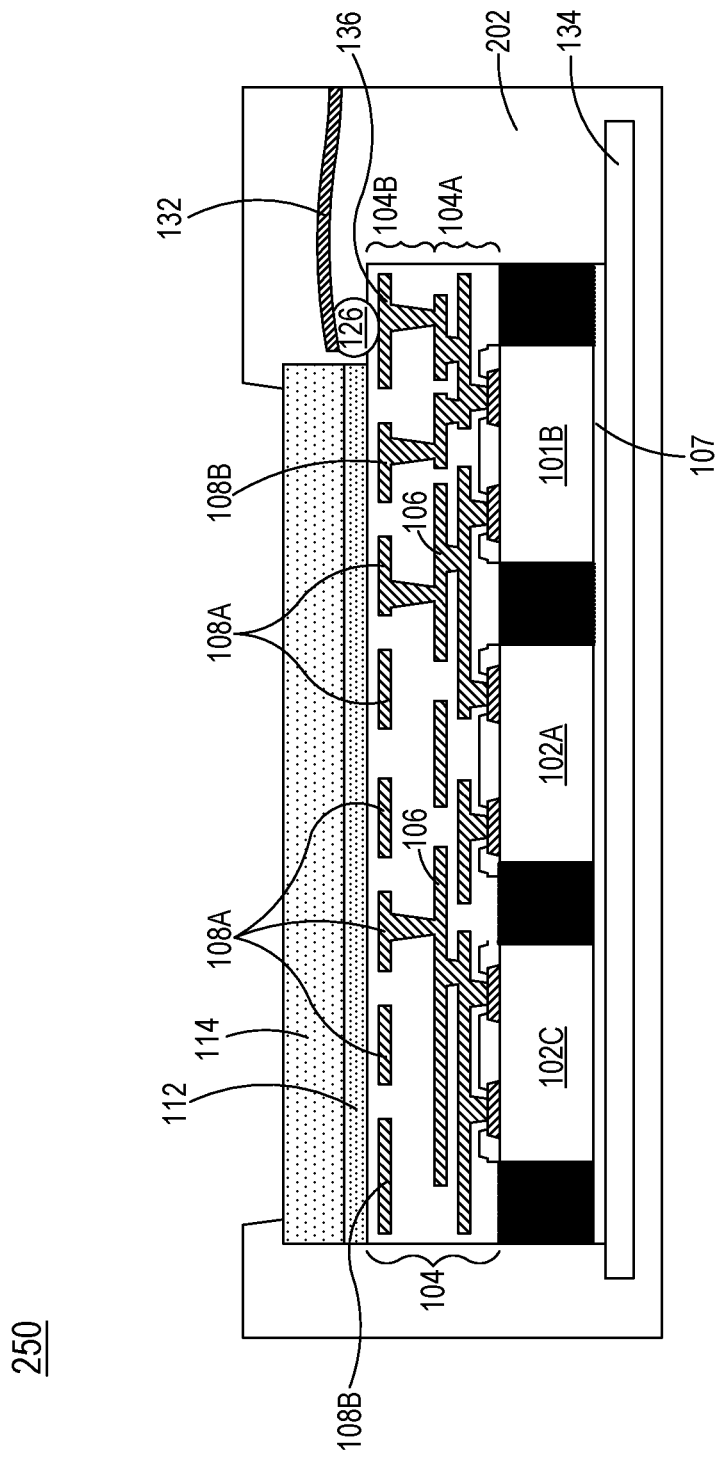

FIGS. 2A and 2B illustrate cross-sectional views of fingerprint sensor device packages 200 and 250 according to some embodiments. Packages 200 and 250 may be similar to packages 100 and 150 where like reference numbers indicate like elements. Packages 200 and 250 may be integrated into the housing of a device 202. In some embodiments, device 202 is a smartcard, or the like. Dies 102A, 102B, and 102C are adhered to a support substrate 134 by an adhesive 107. In some embodiments, support substrate 134 is a printed circuit board, which provides electrical connection between package 200 and various other electronic features (not separately illustrated), which may include other logic dies, memory dies, power supply dies, discrete devices, integrated passive devices, and the like. Adhesive 107 may comprise a die attached film (DAF), such as an epoxy resin, a phenol resin, acrylic rubber, silica filler, or a combination thereof, and is applied using a lamination technique.

Unlike in package 100 where electrical connection to other device features was achieved using backside RDLs 120 (see FIG. 1A), package 200 is electrically connected to other device features by wire bonds 132. In some embodiments, wire bonds 132 includes conductive wires or conductive fingers, which are electrically connected to solder balls 124 disposed on contact pads 136. Contact pads 136 are disposed within RDLs 104, for example, at an uppermost metallization layer within RDLs 104. In some embodiments, contact pads 136 are disposed at a same level as the array of electrodes 108A and finger drive ring 108B. In some embodiments, finger drive ring 108B encircles contact pads 136 (see e.g., FIGS. 2A and 3B). In other embodiments, contact pads 136 are disposed adjacent to and outside of an area encircled by finger drive ring 108B (see e.g., FIGS. 2B and 3C).

Figure 3A:
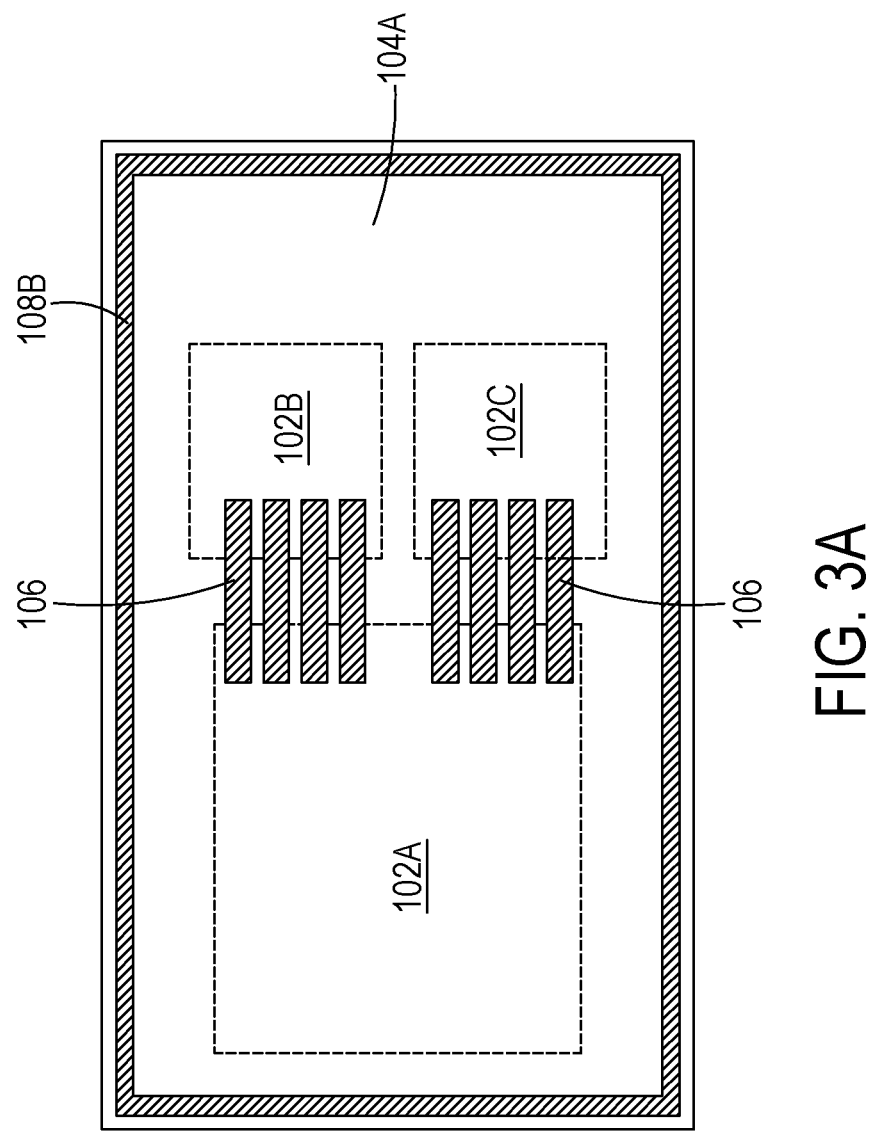
FIGS. 3A through 3C illustrate top-down views of portions of a fingerprint sensor device package according to some embodiments.
Figure 3B:
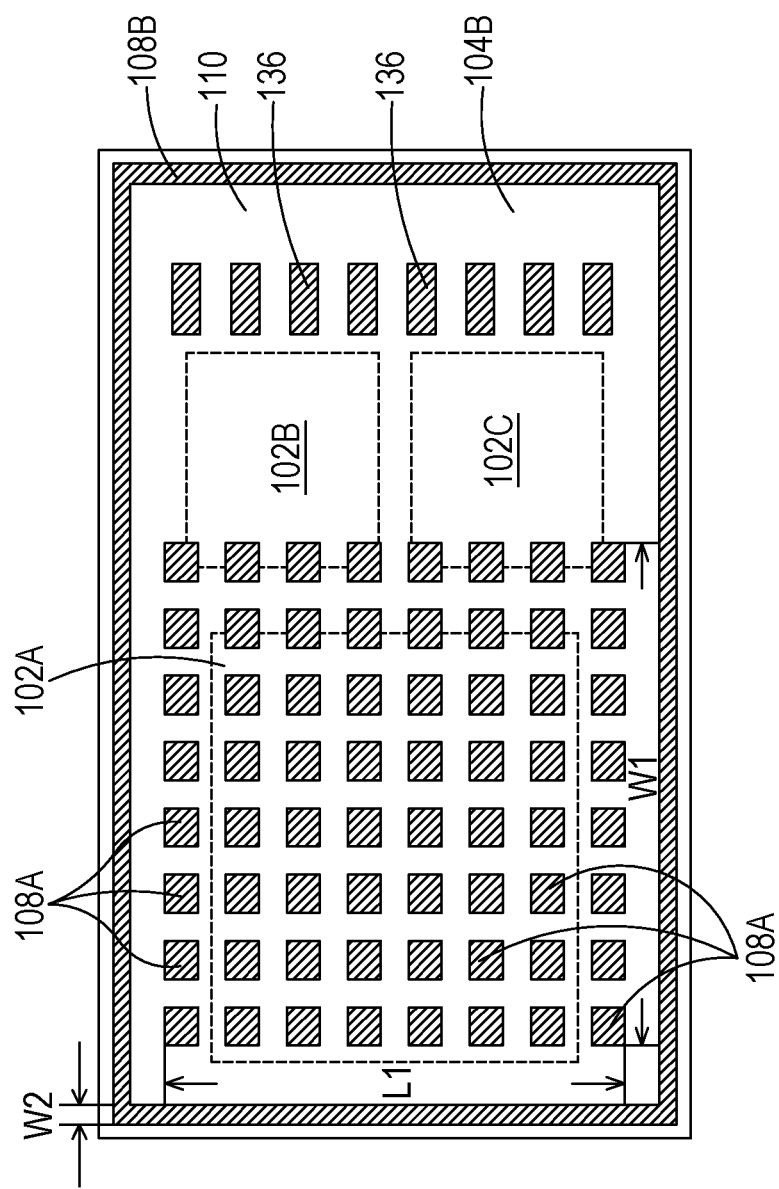
Figure 3C:
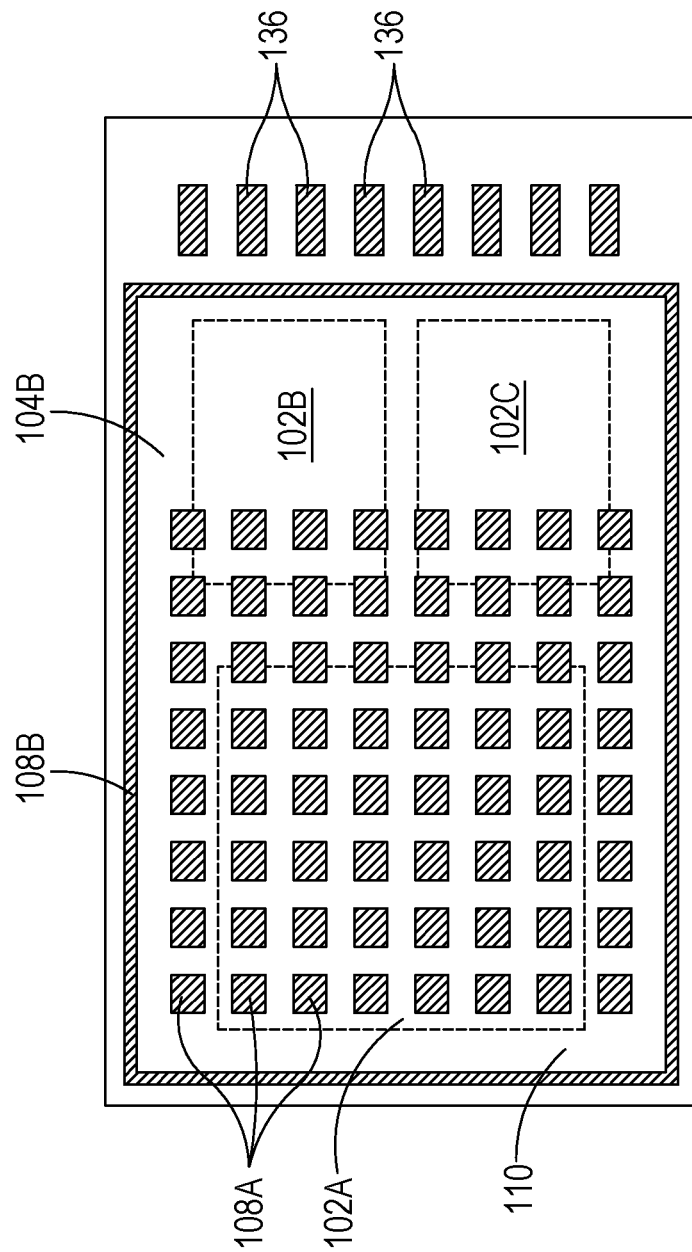

FIGS. 3A through 3C illustrate top-down views of a fingerprint sensing device package (such as packages 100, 150, 200, or 250) according to some embodiments. FIG. 3A illustrates a top-down view of lower layers 104A of fan-out RDLs 104 in an embodiment device package. The locations of dies 102A, 102B, and 102C are shown in ghost with dashed lines. In FIG. 3A, the locations of dies 102A, 102B, and 102C may not match the cross-sectional views of FIG. 1A, 1B, 2A, or 2B. It should be appreciated that dies 102A, 102B, and 102C may be disposed in any suitable location relative to each other (e.g., as illustrated in FIGS. 1A through 3C) or any other suitable locations. As illustrated by FIG. 3A, dies 102A, 102B, and 102C are electrically interconnected by conductive features 106 within lower layers 104A of fan-out RDLs 104.

FIGS. 3B and 3C illustrate top-down views of upper layers 104B of fan-out RDLs 104 in an embodiment device package. As illustrated by FIG. 3B, upper layers 104B of fan-out RDLs 104 include an array of electrodes 108A and a finger drive ring 108B. The array of electrodes 108A includes a grid having rows and columns of electrodes 108A. A dielectric layer 110 may be disposed between adjacent ones of electrodes 108A. Although a particular number of electrodes 108A are illustrated, any number of electrodes 108A may be arranged in any number of rows and columns in various embodiments. Furthermore, the overall size of the array may be sufficiently large to measure the contours of a finger. The array of electrodes 108 has a length L1 measured between opposing outer edges in a first direction and a width W1 measured between opposing outer edges in a second direction perpendicular to the first direction. In some embodiments, length L1 is about 3.5 mm to about 10 mm while width W1 is about 3.5 mm to about 10 mm. Other dimensions may be used in other embodiments. Because the array of electrodes 108A are disposed in fan-out RDLs 104, which extend past edges of sensor die 102A, the overall size of the array of electrodes 108A is not limited to the footprint of sensor die 102A. For example, in the illustrated embodiments, the array of electrodes 108A occupies a larger footprint in a top down view than sensor die 102A, and the array of electrodes 108A may extend directly over other dies in the fingerprint sensor device package, such as HV die 108B and/or microcontroller die 108C. Thus, deploying the array of electrodes 108A in fan-out RDLs 104 advantageously allows for a smaller sensor die 102A to be used while still providing a sufficiently large array of electrodes 108A to take a fingerprint reading. Furthermore, because the size of sensor die 102A can be reduced, the device package can accommodate additional dies, such as, HV die 102B and microcontroller die 102C.

Finger drive ring 108B encircles the array of electrodes 108A. As discussed above, finger drive ring 108B may be included to increase the sensitivity and accuracy of the fingerprint sensor. For example, finger drive ring 108B may be used to generate a variable voltage to a finger applied to the fingerprint sensor. In some embodiments, finger drive ring 108B has a width W2 (e.g., taken between an outer perimeter and an inner perimeter) that is greater than about 50 μm. It has been observed that by configuring finger drive ring 108B to have a width over 50 μm, sensitivity of the fingerprint sensor can be advantageously increased. For example, finger drive rings 108B of the above size are sufficiently large to drive a suitable voltage through a finger in order to use an active capacitance fingerprint sensing method as described above.

In some embodiments, upper layers 104B further includes contact pads 136 for electrical connection to other device features. Finger drive ring 108B may encircle contact pads 136 in the embodiments of FIG. 3B. In other embodiments, contact pads 136 may be disposed outside of an area encircled by finger drive ring 108B as illustrated by FIG. 3C.

FIGS. 3B and 3C illustrate finger drive ring 108B having a single ring and a width greater than about 50 µm. Other embodiments may include figure drive rings having a different shape and/or size. For example, FIGS. 4A through 4E illustrate top-down views of finger drive rings 108B having other configurations. Each finger drive ring 108B encircles an array of electrodes 108A, and each finger drive ring 108B may also optionally encircle contact pads 136. In other embodiments, contact pads 136 may be omitted or disposed outside of an area encircled by finger drive ring 108B.

Figure 4A:
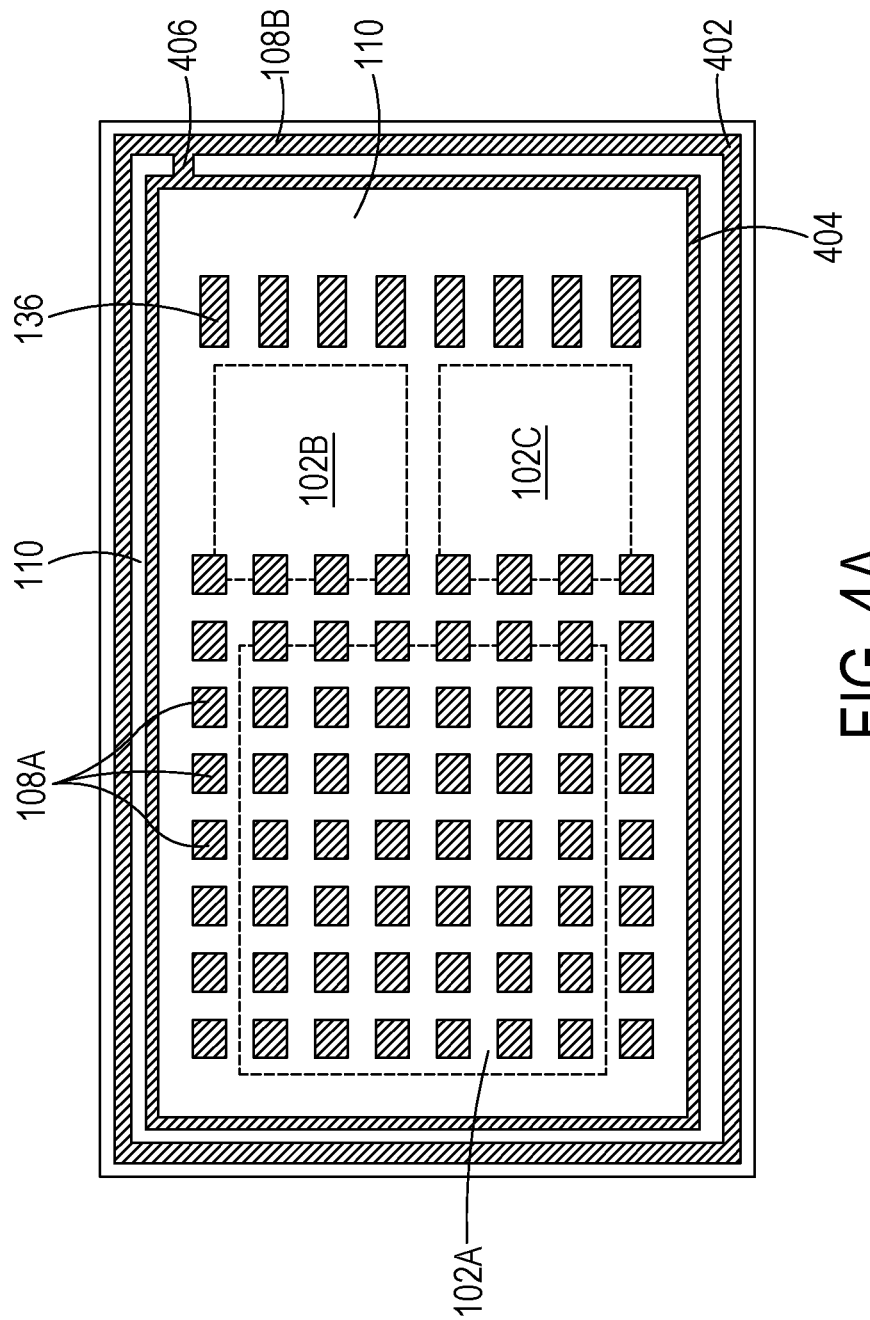
FIGS. 4A through 4E illustrate top-down views of portions of a fingerprint sensor device package according to some other embodiments.

In FIG. 4A, finger drive ring 108B includes an outer ring 402 and an inner ring 404. Outer ring 402 encircles inner ring 404, and a portion of dielectric layer 110 is disposed between inner ring 404 and outer ring 402. Both outer ring 402 and inner ring 404 are continuous rings, which both encircle an array of electrodes 108A. Furthermore, inner ring 404 and outer ring 402 are electrically and physically connected by a strip of conductive material 406 disposed between outer ring 402 and inner ring 404. Each ring 402 and 404 may or may not have a width greater than about 50 µm. The additional inner ring may be included to increase a surface area of finger drive ring 108 and improve sensitivity. Furthermore, the widths of outer ring 402 may be greater than, the same as, or less than a width of inner ring 404.

Figure 4B:
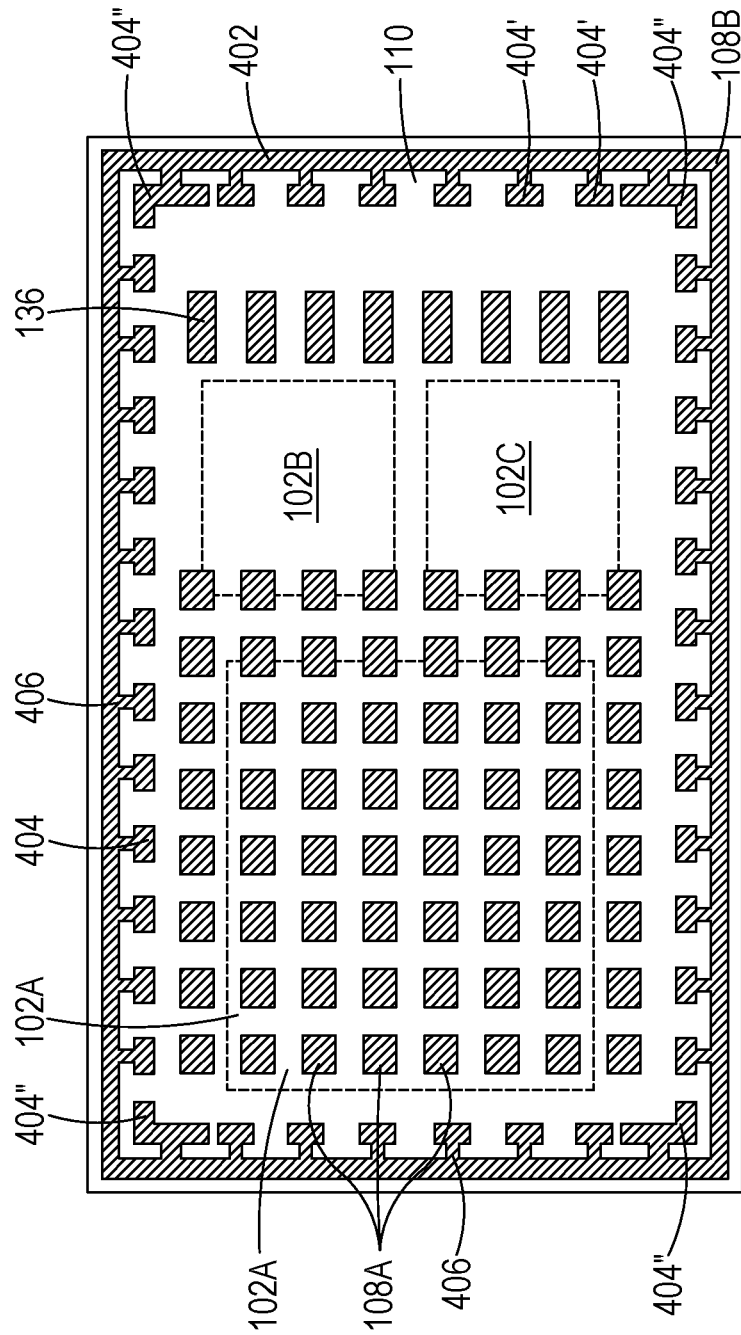

In FIG. 4B, finger drive ring 108 includes an outer ring 402 and an inner ring 404. Outer ring 402 encircles inner ring 404, and a portion of dielectric layer 110 is disposed between inner ring 404 and outer ring 402. Outer ring 402 is a continuous ring while inner ring 404 is discontinuous at various intervals. For example, inner ring 404 includes individual segments 404', which are physically separated from adjacent segments 404' by a portion of dielectric layer 110. In some embodiments, inner ring further includes L-shaped segments 404" at corners of finger drive ring 108B. Each of the segments 404' and 404" are electrically and physically connected to outer ring 402 by strips of conductive material 406 disposed between outer ring 402 and inner ring 404.

Figure 4C:
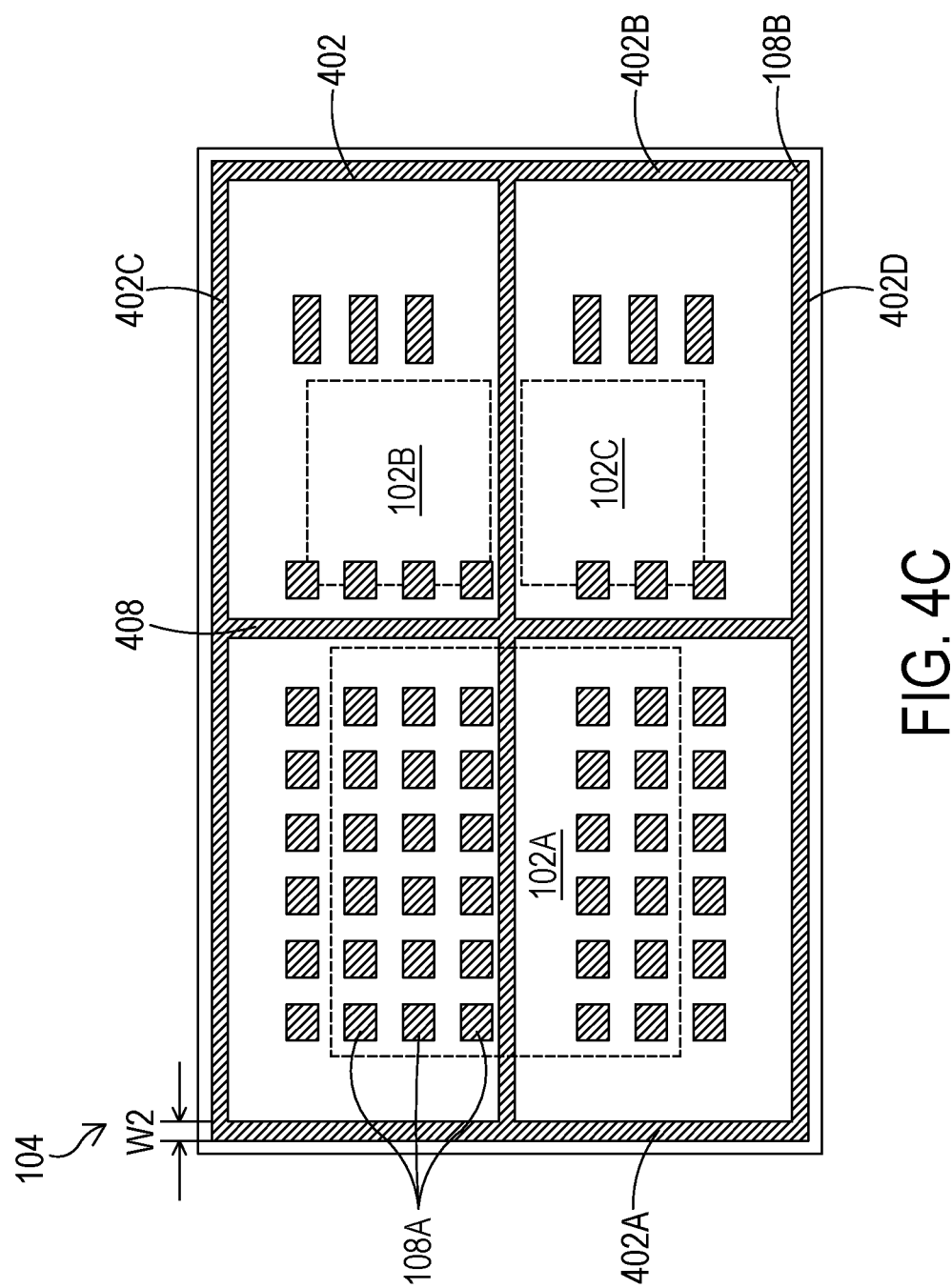
Figure 4D:
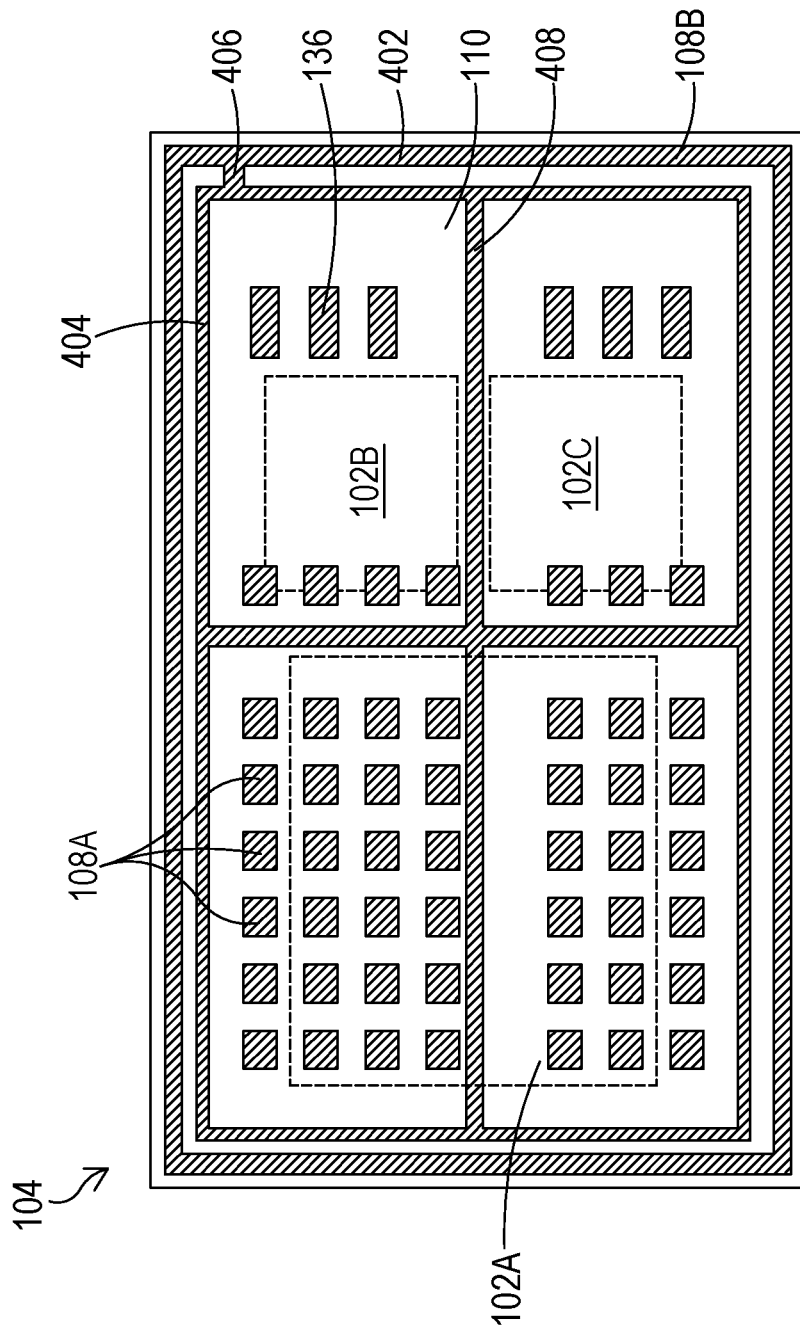
Figure 4E:
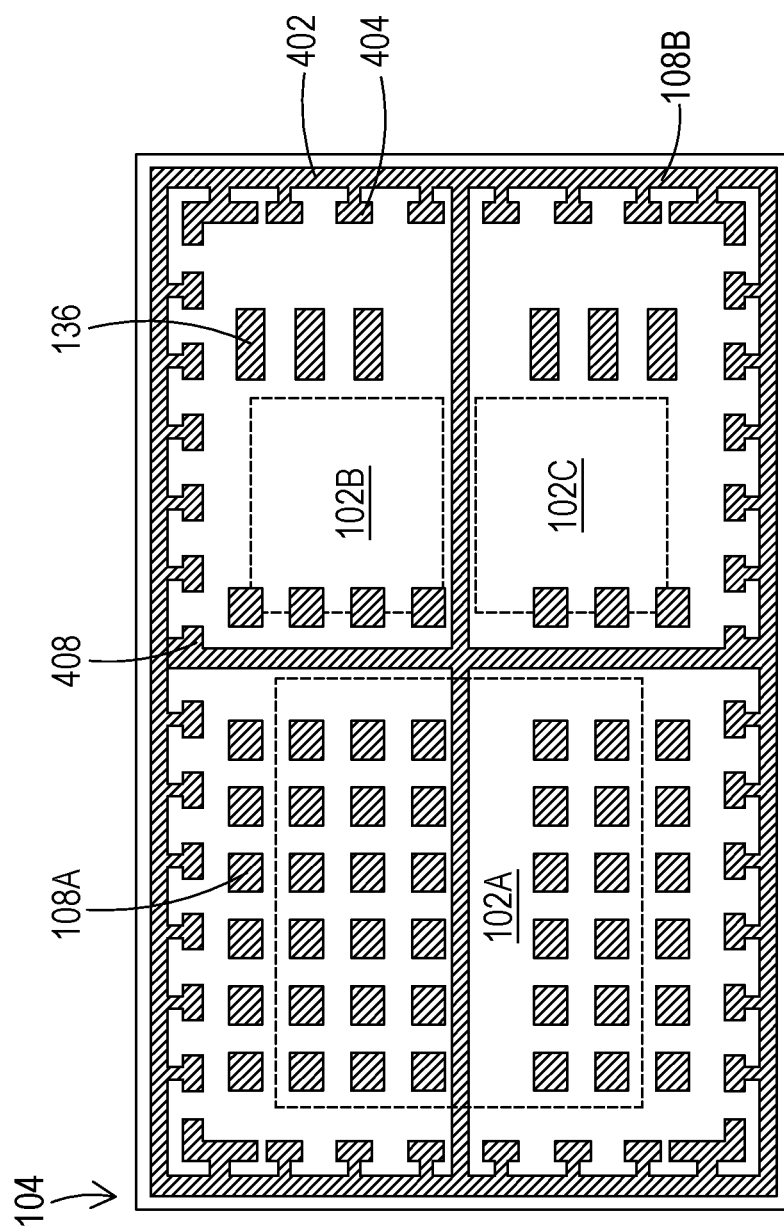

In FIG. 4C, finger drive ring 108B includes a single ring 402 having a first segment 402A, a second segment 402B, a third segment 402C, and a fourth segment 402D. First segment 402A and second segment 402B are disposed perpendicular to third segment 402C and fourth segment 402D. Furthermore, first segment 402A and second segment 402B are disposed on opposing sides of the array of electrodes 108A, and third segment 402C and fourth segment 402D are disposed on opposing sides of the array of electrodes 108A. Finger drive ring 108B further includes a cross-shaped section 408, which connects different segments of ring 402. For example, cross-shaped section 408 spans a distance between and connects first segment 402A to second segment 402B. Cross-shaped section 408 further spans a distance between and connects third segment 402B to fourth segment 402D. Cross-shaped section 408 may be included to increase a surface area of finger drive ring 108B and improve sensitivity. In some embodiments, ring 404 has a width W2, which may be greater than 50 µm. In other embodiments, ring 404 has a width W2, which is less than 50 µm, such as between about 20 µm to about 40 µm depending on layout design. The cross-shaped section 408 may further be incorporated into embodiments with multiple rings, such as embodiments having continuous inner rings 404 (see FIG. 4D) or segmented inner rings 404 (see FIG. 4E).

Figure 5D:
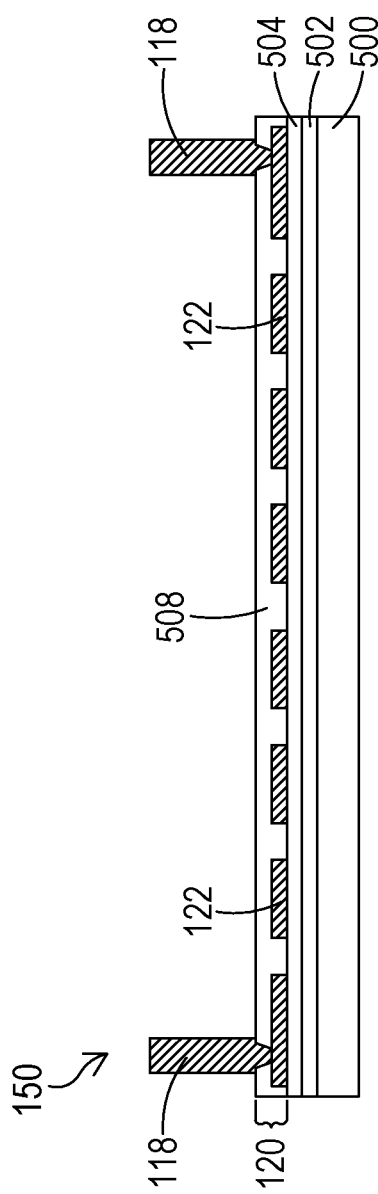
FIGS. 5A through 5S illustrate cross-sectional views of intermediary stages of manufacturing a fingerprint sensor device package according to some embodiments.
Figure 5E:
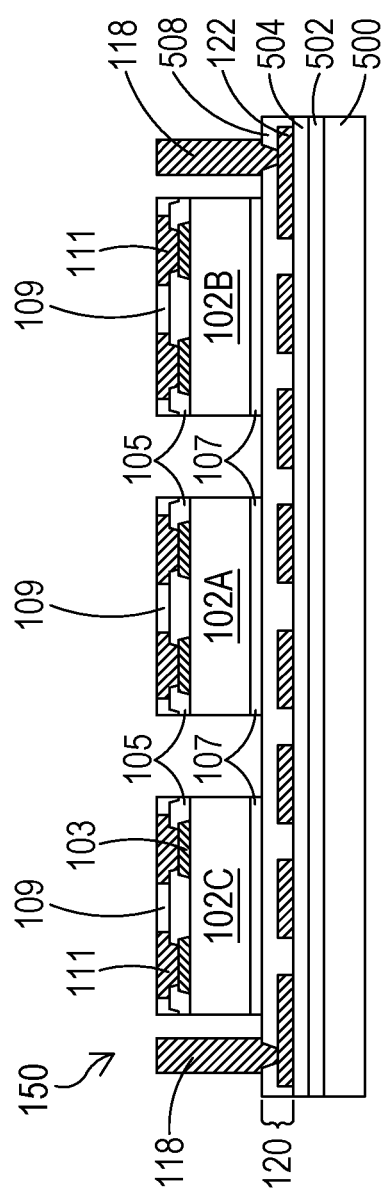
Figure 5J:
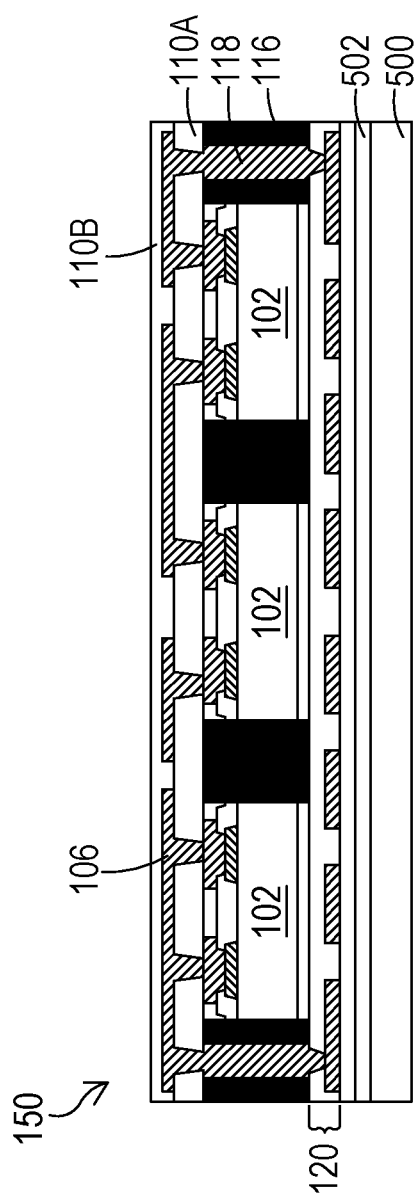
Figure 5K:
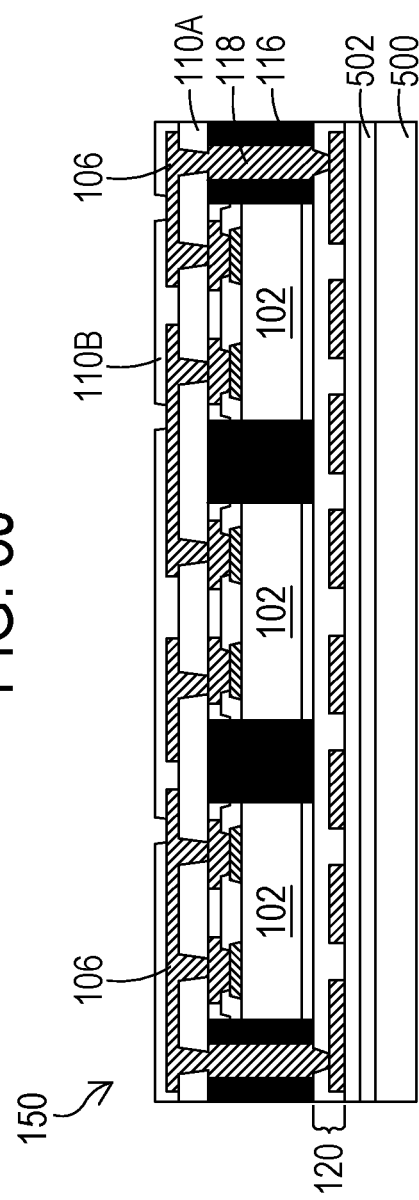
Figure 5L:
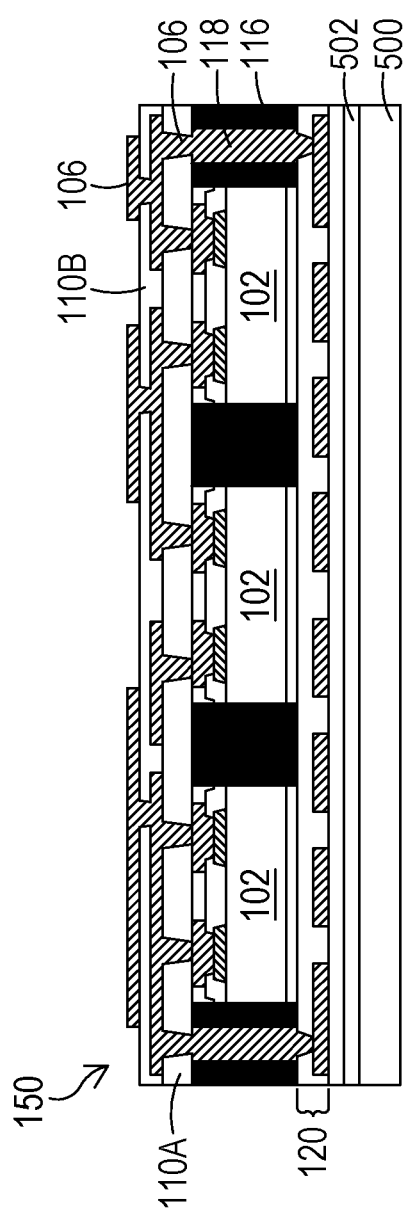
Figure 5M:
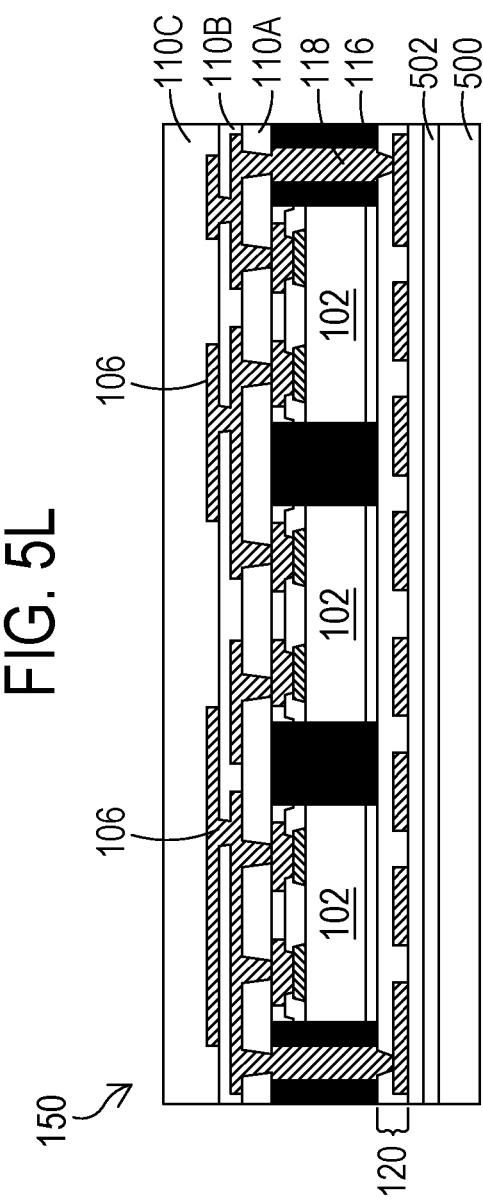
Figure 5N:
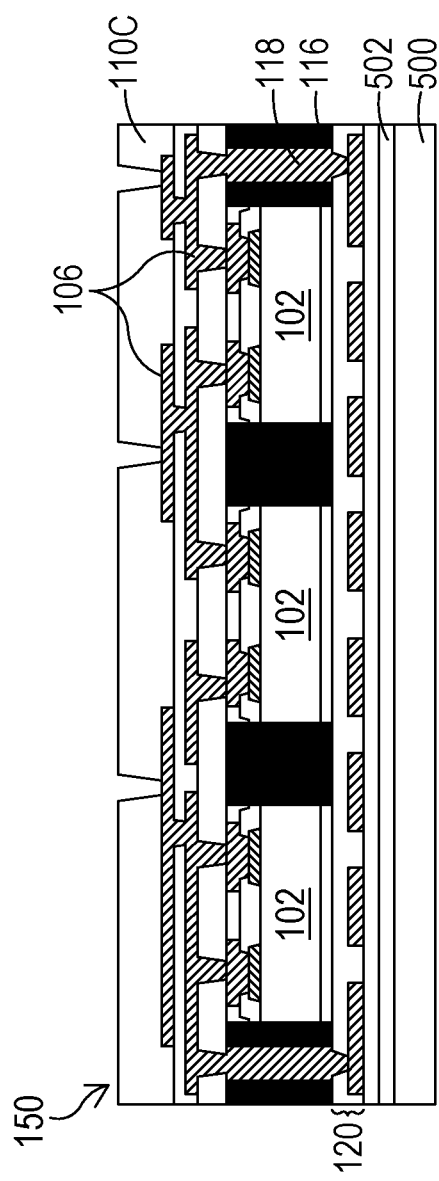
Figure 5O:
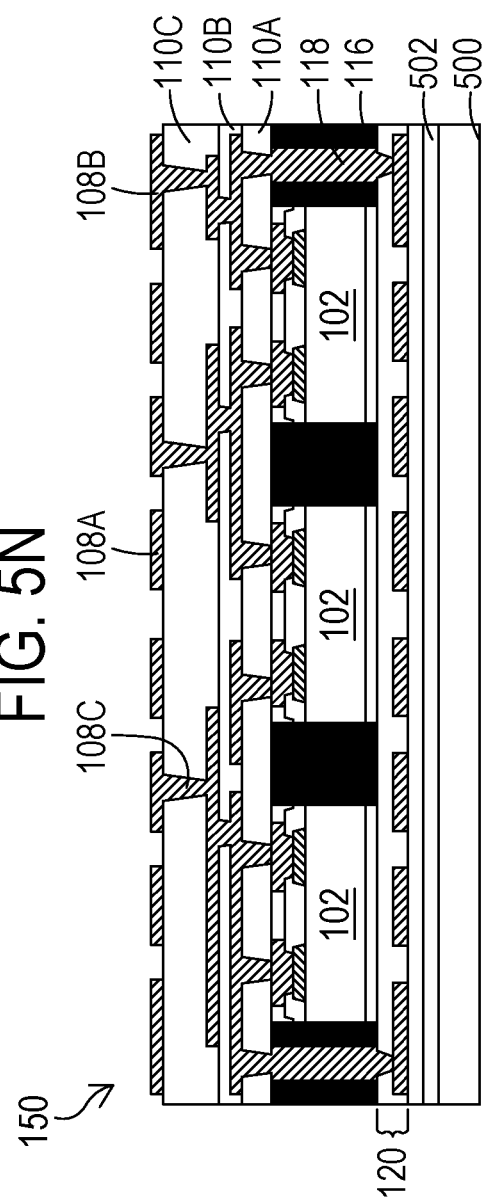
Figure 5P:
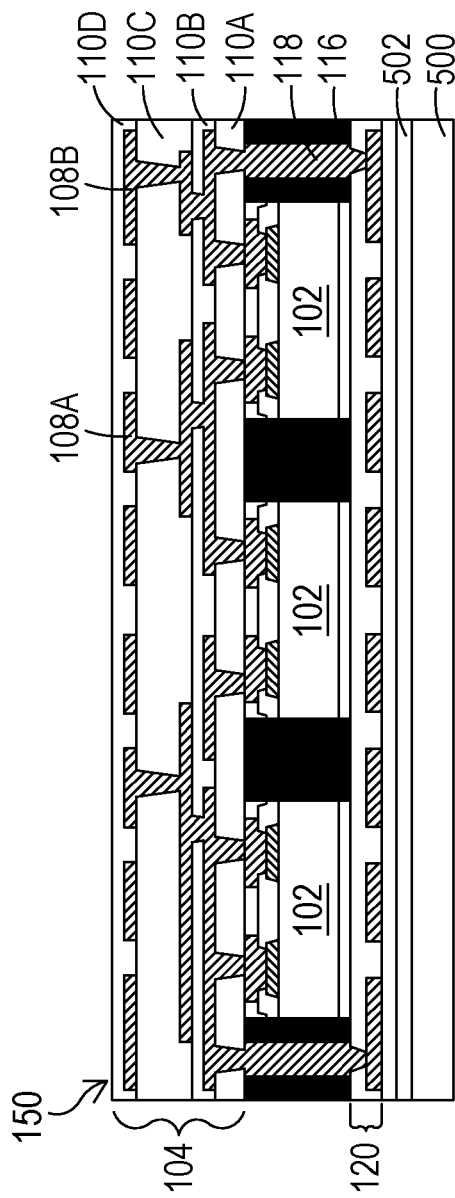
Figure 5Q:
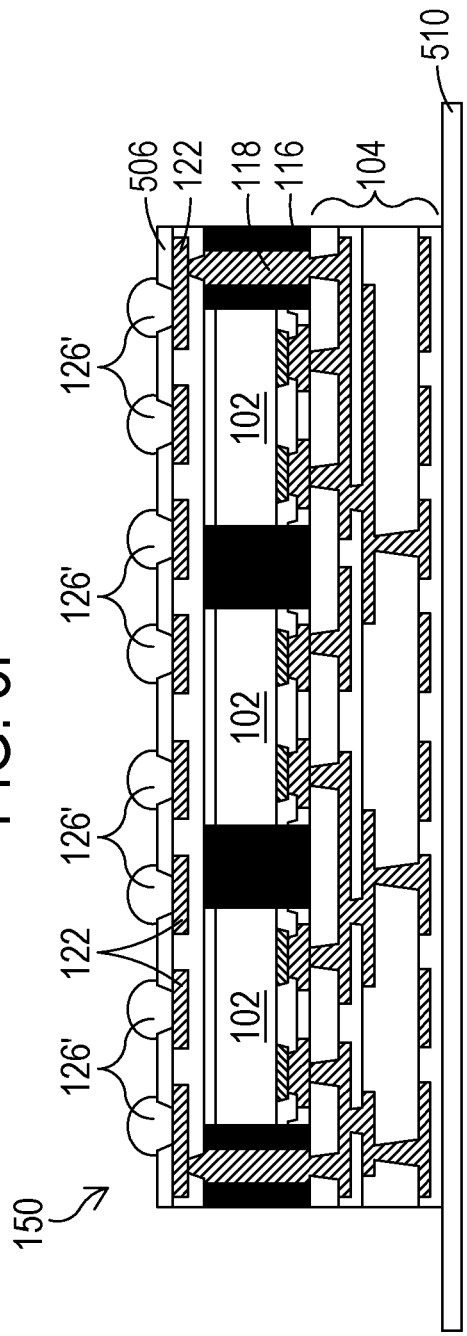
Figure 5R:
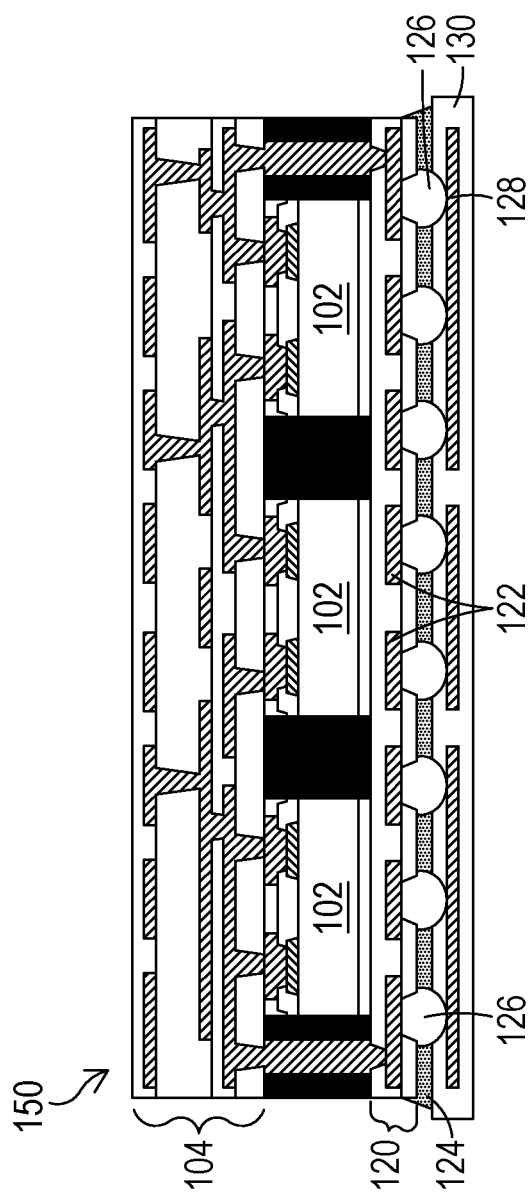
Figure 5S:
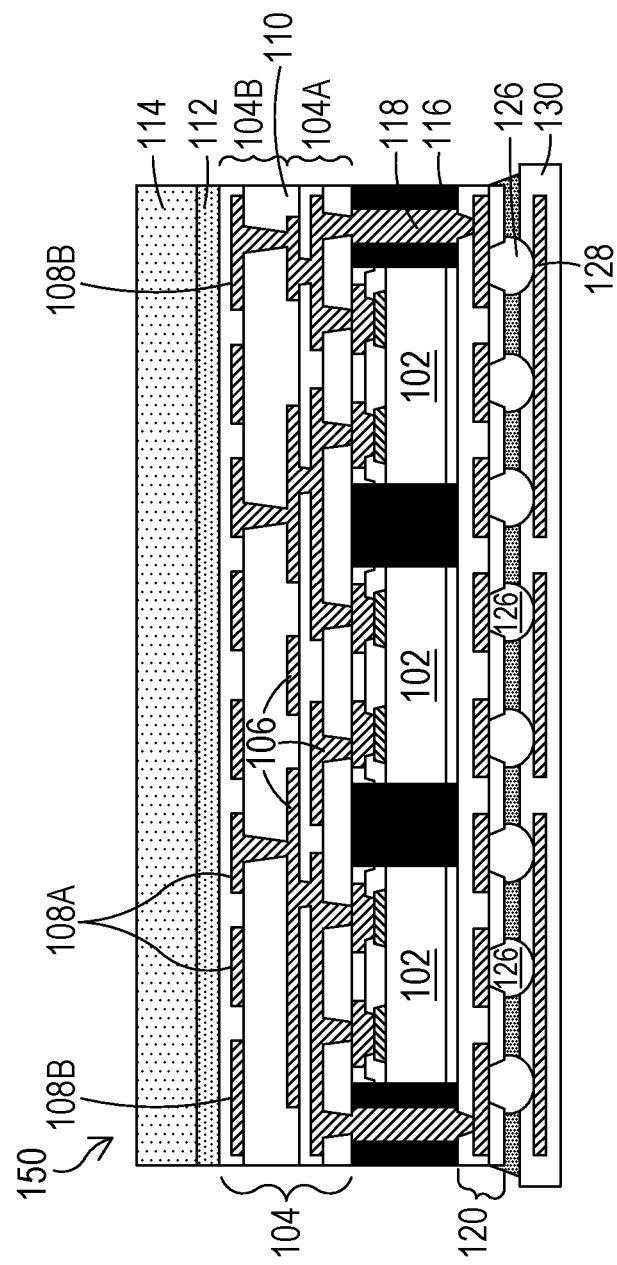

FIGS. 5A through 5S illustrate cross-sectional views of intermediary steps of manufacturing a fingerprint sensor device package 150 (see FIG. 1B) according to some embodiments. FIG. 5A illustrates a carrier substrate 500 and a release layer 502 formed on carrier substrate 500.

Carrier substrate 500 may be a glass carrier substrate, a ceramic carrier substrate, or the like. Carrier substrate 500 may be a wafer, such that multiple packages can be formed on the carrier substrate 100 simultaneously. Release layer 502 may be formed of a polymer-based material, which may be removed along with carrier substrate 500 from the overlying structures that will be formed in subsequent steps. In some embodiments, release layer 502 is an epoxy-based thermal-release material, which loses its adhesive property when heated, such as a Light-to-Heat-Conversion (LTHC) release coating. In other embodiments, release layer 502 may be an ultra-violet (UV) glue, which loses its adhesive property when exposed to UV lights. Release layer 502 may be dispensed as a liquid and cured, may be a laminate film laminated onto carrier substrate 500. The top surface of release layer 502 may be leveled and may have a high degree of co-planarity.

As illustrated in FIG. 5A, a dielectric layer 504 is formed on release layer 502. The bottom surface of dielectric layer 504 may be in contact with the top surface of release layer 502. In some embodiments, dielectric layer 504 is formed of a polymer, such as PBO, polyimide, BCB, or the like. In other embodiments, dielectric layer 504 is formed of a nitride such as silicon nitride; an oxide such as silicon oxide, PSG, BSG, or BPSG; or the like. Other materials may be used as well. Dielectric layer 504 may be formed by any acceptable deposition process, such as spin coating, chemical vapor deposition (CVD), laminating, the like, or a combination thereof.

As illustrated in FIG. 5B, conductive features 122 are formed on dielectric layer 504. As an example to form conductive features 122, a seed layer (not shown) is formed over dielectric layer 504. In some embodiments, the seed layer is a metal layer, which may be a single layer or a composite layer comprising a plurality of sub-layers formed of different materials. In some embodiments, the seed layer comprises a titanium layer and a copper layer over the titanium layer. The seed layer may be formed using, for example, PVD or the like. A photoresist is then formed and patterned on the seed layer. The photoresist may be formed by spin coating or the like and may be exposed to light for patterning. The pattern of the photoresist corresponds to pattern of conductive features 122. The patterning forms openings through the photoresist to expose the seed layer. A conductive material is formed in the openings of the photoresist and on the exposed portions of the seed layer. The conductive material may be formed by plating, such as electroplating or electroless plating, or the like. The conductive material may comprise a metal, like copper, titanium, tungsten, aluminum, or the like. Then, the photoresist and portions of the seed layer on which the conductive material is not formed are removed. The photoresist may be removed by an acceptable ashing or stripping process, such as using an oxygen plasma or the like. Once the photoresist is removed, exposed portions of the seed layer are removed, such as by using an acceptable etching process, such as by wet or dry etching. The remaining portions of the seed layer and conductive material form conductive features 122 as illustrated.

In FIG. 5C, a dielectric layer 508 is formed on conductive features 122 and dielectric layer 504. In some embodiments, dielectric layer 508 is formed of a polymer, which may be a photo-sensitive material such as PBO, polyimide, BCB, or the like, that may be patterned using a lithography mask. In other embodiments, dielectric layer 508 is formed of a nitride such as silicon nitride; an oxide such as silicon oxide, PSG, BSG, or BPSG; or the like. Dielectric layer 508 may be formed by spin coating, lamination, CVD, the like, or a combination thereof. Dielectric layer 508 is then patterned to form openings to expose portions of conductive features 122. The patterning may be by an acceptable process, such as by exposing dielectric layer 508 to light when the dielectric layer is a photo-sensitive material or by etching using, for example, an anisotropic etch.

Thus, backside RDLs 120 are formed including dielectric layers 504 and 508 and conductive features 122. As illustrated, backside RDLs 120 include two dielectric layers and one metallization pattern (e.g., the pattern of conductive features 122). In other embodiments, backside RDLs 120 can include any number of dielectric layers, metallization patterns, and vias. One or more additional metallization pattern and dielectric layer may be formed in backside RDLs 120 by repeating the processes for forming conductive features 122 and dielectric layer 508. Vias may be formed during the formation of a metallization pattern by forming the seed layer and conductive material of the conductive features in the opening of the underlying dielectric layer. The vias may therefore interconnect and electrically couple the various conductive features.

Referring next to FIG. 5D, through vias 118 are formed. As an example to form through vias 118, a seed layer is formed over backside RDLs 120. In some embodiments, the seed layer is a metal layer, which may be a single layer or a composite layer comprising a plurality of sub-layers formed of different materials. In some embodiments, the seed layer comprises a titanium layer and a copper layer over the titanium layer. The seed layer may be formed using, for example, PVD or the like. A photoresist is formed and patterned on the seed layer. The photoresist may be formed by spin coating or the like and may be exposed to light for patterning. The pattern of the photoresist corresponds to through vias 118. The patterning forms openings through the photoresist to expose the seed layer. A conductive material is formed in the openings of the photoresist and on the exposed portions of the seed layer. The conductive material may be formed by plating, such as electroplating or electroless plating, or the like. The conductive material may comprise a metal, like copper, titanium, tungsten, aluminum, or the like. The photoresist and portions of the seed layer on which the conductive material is not formed are removed. The photoresist may be removed by an acceptable ashing or stripping process, such as using an oxygen plasma or the like. Once the photoresist is removed, exposed portions of the seed layer are removed, such as by using an acceptable etching process, such as by wet or dry etching. The remaining portions of the seed layer and conductive material form through vias 118.

In FIG. 5E, integrated circuit dies 102 (labeled as dies 102A, 102B, and 102C) are adhered to dielectric layer 508 by an adhesive 107. Dies 102 may include a sensor die 102A (e.g., having finger print sensor logic circuitry), a microcontroller die 102B (e.g., having finger print comparison and verification logic circuitry), and a HV die 102C as described above. Other dies may also be included in addition to or in lieu of microcontroller die 102B and/or HV die 102C. Before being adhered to dielectric layer 508, dies 102 may be processed according to applicable manufacturing processes to form integrated circuits in dies 102 and include various die features as described above.

As further illustrated, optional dielectric material 109 is disposed over each integrated circuit die 102, such as on passivation films 105 and contact pads 103. Dielectric material 109 laterally encapsulates optional conductive pillars 111, which are disposed on and are electrically connected to contact pads 103. In some embodiments, dielectric material 109 is laterally co-terminus with the respective dies 102. Dielectric material 109 may be a polymer such as PBO, polyimide, BCB, or the like; a nitride such as silicon nitride or the like; an oxide such as silicon oxide, PSG, BSG, BPSG, or the like; or a combination thereof, and may be formed, for example, by spin coating, lamination, CVD, or the like. In other embodiments, (e.g., see FIG. 1A), conductive pillars 111 and dielectric material 109 may be omitted.

Adhesive 107 is disposed on back sides of dies 102 and adheres dies 102 to back side RDLs 120, such as dielectric layer 508 in the illustration. Adhesive 107 may be any suitable adhesive, epoxy, DAF, or the like. Adhesive 107 may be applied to a back side of dies 102, such as to a back side of the respective semiconductor wafer or may be applied over the surface of carrier substrate 500. Dies 102 may be singulated, such as by sawing or dicing, and adhered to dielectric layer 502 by adhesive 107 using, for example, a pick-and-place tool.

In FIG. 5F, the various components are encapsulated in a molding compound 116. In an embodiment, molding compound 116 may be applied by compression molding, transfer molding, or the like. In an embodiment, molding compound 116 may be applied to cover top surfaces of dies 102. After curing, molding compound 116 can undergo a grinding process to expose through vias 118 and conductive pillars 111. Top surfaces of through vias 118, conductive pillars 111, and molding compound 116 are co-planar after the grinding process. In some embodiments, the grinding may be omitted, for example, if through vias 118 and conductive pillars 111 are already exposed.

In another embodiment, molding compound 116 may be applied using an exposed molding process, for example, in embodiments where conductive pillars 111 and dielectric material 109 are omitted. In an embodiment exposed molding process, a mold chase having a release film (e.g., comprising polyethylene terephthalate (PET), teflon, or other suitable material) is applied to top surfaces of dies 102, and molding compound 116 is injected around dies 102. Because a release film is applied to top surfaces of dies 102 while molding compound 116 is injected, molding compound 116 is not formed over dies 102. Thus, molding compound 116 does not need to be subsequently planarized to expose electrical connectors to dies 102. In some embodiments, the release film may further cover top surfaces of through vias 118. In other embodiments, through vias 118 are formed after molding, for example, by patterning openings in molding compound 116 and filling the openings with a conductive material. Patterning the openings may include a laser etching process, a combination of photolithography and/or etching, and the like. In embodiments where an exposed molding process is used, a top surface of molding compound 116 may be level with or lower than top surfaces of dies 102.

In FIGS. 5G through 5P, front side RDLs 104 are formed. As will be illustrated in FIG. 5P, RDLs 104 include multiple dielectric layers 110, conductive features 106, an array of electrodes 108A, and a finger drive ring 108B.

In FIG. 5G, a dielectric layer 110A is deposited on molding compound 116, through vias 118, and conductive pillars 111. In some embodiments, dielectric layer 110A may be a photo-sensitive material such as PBO, polyimide, BCB, or the like, that may be patterned using a lithography mask. In other embodiments, dielectric layer 110A can be formed of a nitride such as silicon nitride; an oxide such as silicon oxide, PSG, BSG, or BPSG; or the like. Dielectric layer 110A may be formed by spin coating, lamination, CVD, the like, or a combination thereof.

In FIG. 5H, dielectric layer 110A is then patterned. The patterning forms openings to expose portions of through vias 118 and conductive pillars 111 (or contact pads 103 in embodiments where conductive pillars 111 are excluded). The patterning may be by an acceptable process, such as by exposing dielectric layer 110A to light when dielectric layer 110A is a photosensitive material or by etching using, for example, an anisotropic etch. If dielectric layer 110A is a photosensitive material, dielectric layer 110A can be developed after the exposure.

In FIG. 5I, conductive features 106 with vias are formed on dielectric layer 110A. As an example to form conductive features, a seed layer (not shown) is formed over dielectric layer 110A and in openings through dielectric layer 110A. In some embodiments, the seed layer is a metal layer, which may be a single layer or a composite layer comprising a plurality of sub-layers formed of different materials. In some embodiments, the seed layer comprises a titanium layer and a copper layer over the titanium layer. The seed layer may be formed using, for example, PVD or the like. A photoresist is then formed and patterned on the seed layer. The photoresist may be formed by spin coating or the like and may be exposed to light for patterning. The pattern of the photoresist corresponds to conductive features 106. The patterning forms openings through the photoresist to expose the seed layer. A conductive material is formed in the openings of the photoresist and on the exposed portions of the seed layer. The conductive material may be formed by plating, such as electroplating or electroless plating, or the like. The conductive material may comprise a metal, like copper, titanium, tungsten, aluminum, or the like. Then, the photoresist and portions of the seed layer on which the conductive material is not formed are removed. The photoresist may be removed by an acceptable ashing or stripping process, such as using an oxygen plasma or the like. Once the photoresist is removed, exposed portions of the seed layer are removed, such as by using an acceptable etching process, such as by wet or dry etching. The remaining portions of the seed layer and conductive material form conductive lines 106A and conductive vias 106B. Conductive vias 106B formed in openings through dielectric layer 110A to, e.g., through vias 118 and/or conductive pillars 111 (or contact pads 103 in embodiments where conductive pillars 111 are excluded). In various embodiments, conductive features 106 provide electrical routing between individual dies 102 as well as electrical routing between dies 102 and backside RDLs 120 using through vias 118.

In FIG. 5J, dielectric layer 110B is deposited on conductive features 106 and dielectric layer 110A. In some embodiments, dielectric layer 110B is formed of a polymer, which may be a photo-sensitive material such as PBO, polyimide, BCB, or the like, that may be patterned using a lithography mask. In other embodiments, dielectric layer 110B can be formed of a nitride such as silicon nitride; an oxide such as silicon oxide, PSG, BSG, or BPSG; or the like. Dielectric layer 110B may be formed by spin coating, lamination, CVD, the like, or a combination thereof.

In FIG. 5K, dielectric layer 110B is then patterned. The patterning forms openings to expose portions of conductive features 106. The patterning may be by an acceptable process, such as by exposing dielectric layer 110B to light when the dielectric layer is a photosensitive material or by etching using, for example, an anisotropic etch. If dielectric layer 110B is a photosensitive material, dielectric layer 110B can be developed after the exposure.

In FIG. 5L, additional conductive features 106 with vias are formed on dielectric layer 110B. As an example to form additional conductive features 106, a seed layer (not shown) is formed over dielectric layer 110B and in openings through the dielectric layer 110B. In some embodiments, the seed layer is a metal layer, which may be a single layer or a composite layer comprising a plurality of sub-layers formed of different materials. In some embodiments, the seed layer comprises a titanium layer and a copper layer over the titanium layer. The seed layer may be formed using, for example, PVD or the like. A photoresist is then formed and patterned on the seed layer. The photoresist may be formed by spin coating or the like and may be exposed to light for patterning. The pattern of the photoresist corresponds to the metallization pattern of the additional conductive features 106. The patterning forms openings through the photoresist to expose the seed layer. A conductive material is formed in the openings of the photoresist and on the exposed portions of the seed layer. The conductive material may be formed by plating, such as electroplating or electroless plating, or the like. The conductive material may comprise a metal, like copper, titanium, tungsten, aluminum, or the like. Then, the photoresist and portions of the seed layer on which the conductive material is not formed are removed. The photoresist may be removed by an acceptable ashing or stripping process, such as using an oxygen plasma or the like. Once the photoresist is removed, exposed portions of the seed layer are removed, such as by using an acceptable etching process, such as by wet or dry etching. The remaining portions of the seed layer and conductive material form the additional conductive features 106. The vias of the additional conductive features 106 are formed in openings through dielectric layer 110B to, e.g., portions of the lower conductive features 106 in dielectric layer 110A.

In FIG. 5M, dielectric layer 110C is deposited on conductive features 106 and dielectric layer 110B. In some embodiments, dielectric layer 110C is formed of a polymer, which may be a photo-sensitive material such as PBO, polyimide, BCB, or the like, that may be patterned using a lithography mask. In other embodiments, the dielectric layer 110C can be formed of a nitride such as silicon nitride; an oxide such as silicon oxide, PSG, BSG, or BPSG; or the like. Dielectric layer 110C may be formed by spin coating, lamination, CVD, the like, or a combination thereof. In some embodiments, dielectric layer 110C is thicker than dielectric layers 110A or 110B so that the subsequently formed array of electrodes 108A (see FIGS. 1B and 5O) can be spaced further from conductive features 106 for improved isolation.

In FIG. 5N, dielectric layer 110C is then patterned. The patterning forms openings to expose portions of conductive features 106. The patterning may be by an acceptable process, such as by exposing dielectric layer 110C to light when the dielectric layer is a photosensitive material or by etching using, for example, an anisotropic etch. If dielectric layer 110C is a photo-sensitive material, dielectric layer 110C can be developed after the exposure.

In 5O, metallization pattern 108 with vias is formed on the dielectric layer 148. As an example to form metallization pattern 108, a seed layer (not shown) is formed over dielectric layer 110C and in openings through dielectric layer 110C. In some embodiments, the seed layer is a metal layer, which may be a single layer or a composite layer comprising a plurality of sub-layers formed of different materials. In some embodiments, the seed layer comprises a titanium layer and a copper layer over the titanium layer. The seed layer may be formed using, for example, PVD or the like. A photoresist is then formed and patterned on the seed layer. The photoresist may be formed by spin coating or the like and may be exposed to light for patterning. The pattern of the photoresist corresponds to metallization pattern 108. The patterning forms openings through the photoresist to expose the seed layer. A conductive material is formed in the openings of the photoresist and on the exposed portions of the seed layer. The conductive material may be formed by plating, such as electroplating or electroless plating, or the like. The conductive material may comprise a metal, like copper, titanium, tungsten, aluminum, or the like. Then, the photoresist and portions of the seed layer on which the conductive material is not formed are removed. The photoresist may be removed by an acceptable ashing or stripping process, such as using an oxygen plasma or the like. Once the photoresist is removed, exposed portions of the seed layer are removed, such as by using an acceptable etching process, such as by wet or dry etching. The remaining portions of the seed layer and conductive material form metallization pattern 108.

Metallization pattern 108 includes an array of electrodes 108A, a finger drive ring 108C, and vias 108C. As described above, the array of electrodes may be used by sensor die 102A to detect a fingerprint of a finger applied to finger print sensor package 100. Finger drive ring 108C may be used to apply a voltage to the finger applied to the finger print sensor package and improve overall fingerprint sensor sensitivity. Vias 108C are formed in openings through dielectric layer 110 and are used to electrically connect the array of electrodes 108A and finger drive 108B to dies 102. Because dielectric layer 110C was deposited to be relatively thick, vias 108C may have a greater vertical dimension than vias 106B (see FIG. 5I) of conductive features 106. The array of electrodes 108A and finger drive ring 108B may have any suitable configuration, such as a configuration described above with respect to FIGS. 3A through 4E.

In FIG. 5P, a dielectric layer 110D is deposited on metallization pattern 108 and dielectric layer 110C. In some embodiments, dielectric layer 110D is formed of a polymer, which may be a photo-sensitive material such as PBO, polyimide, BCB, or the like, that may be patterned using a lithography mask. In other embodiments, dielectric layer 110D can be formed of a nitride such as silicon nitride; an oxide such as silicon oxide, PSG, BSG, or BPSG; or the like. Dielectric layer 110D may be formed by spin coating, lamination, CVD, the like, or a combination thereof. In some embodiments, dielectric layer 110D serves as a passivation layer to protect the underlying metallization pattern 108 during subsequent processing and/o operation of the fingerprint sensor device package 150.

In FIG. 5Q, a carrier substrate de-bonding is performed to detach (de-bond) carrier substrate 500 from backside RDLs 120, e.g., dielectric layer 504. In accordance with some embodiments, the de-bonding includes projecting a light such as a laser light or an UV light on release layer 502 so that release layer 502 decomposes under the heat of the light and carrier substrate 500 can be removed. The structure is then flipped over and placed on a tape 510.

As further illustrated in FIG. 5Q, after carrier substrate 500 is de-bonded, openings are formed through the dielectric layer 504 to expose portions of conductive features 122. The openings may be formed, for example, using laser drilling, etching, or the like. Connectors 126' may be disposed in the openings in dielectric layer 504. In some embodiments, connectors 126' comprise solder paste for connection with solder balls in subsequent process steps. Furthermore, a singulation process (not illustrated) may be performed along scribe line regions e.g., between adjacent device packages 150 (not illustrated). The sawing singulates package 150 from other packages (not illustrated).

In FIG. 5R, another package component 130 (another device die, an interposer, a package substrate, a printed circuit board, a mother board, or the like) is bonded to backside RDLs 120 by connectors 126. In an embodiment, connectors 126 are solder balls applied to solder paste 126' (see FIG. 5Q) on conductive features 122. Connectors 126 electrically connects conductive features 122 to conductive features 128 in package component 130. An underfill 124 may also be dispensed around connectors 126.

In FIG. 5S, a sensor surface material 114 (e.g., sapphire, glass, or the like) is adhered to a top surface of fan-out RDLs 104 (e.g., a surface of fan-out RDLs 104 opposing dies 102) with the assistance of a glue layer 112. In an embodiment the glue layer 112 is a color film or adhesive glue, such as an epoxy resin, a phenol resin, acrylic rubber, silica filler, or a combination thereof. However, any other suitable material may be utilized. Thus, an integrated fan-out (InFO) finger print device package 150 may be completed having an array of electrodes 108A and a finger drive ring 108B in fan-out RDLs 104.

Figure 6A:
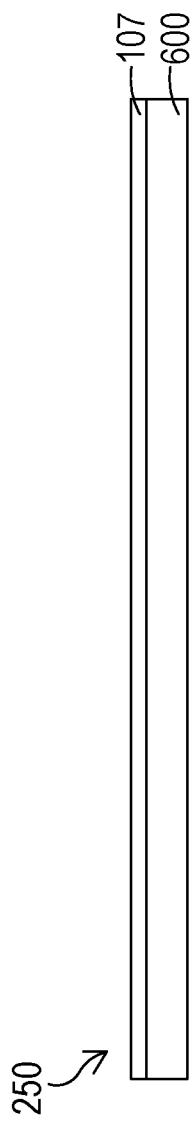

FIGS. 6A through 6G illustrate cross-sectional views of intermediary steps of manufacturing a fingerprint sensor device package 250 (see FIG. 2B) according to some embodiments. FIG. 6A illustrates a carrier substrate 600 and an adhesive 107 formed on carrier substrate 600. In various embodiments carrier substrate 600 may be substantially similar to carrier substrate 500 (see FIG. 5A). Adhesive 107 may comprise a DAF, such as an epoxy resin, a phenol resin, acrylic rubber, silica filler, or a combination thereof, and is applied to carrier substrate 600 using a lamination technique.

Figure 6B:
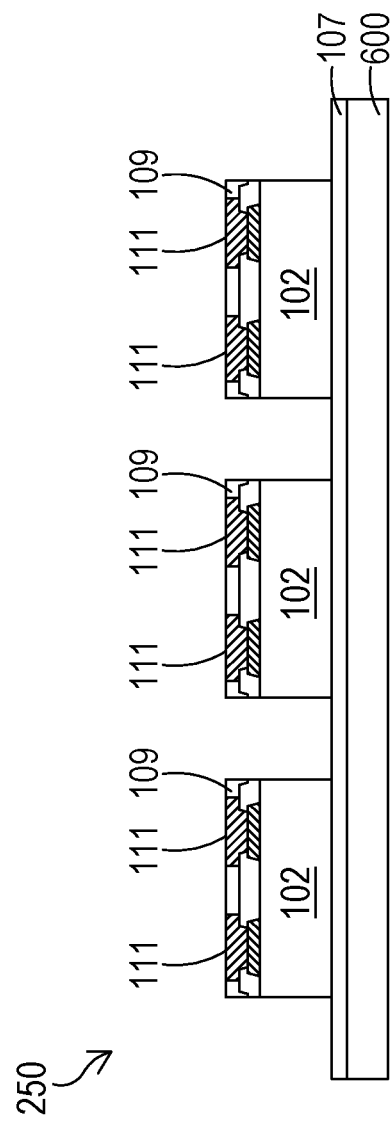

In FIG. 6B, dies 102 are attached to carrier substrate 600 by adhesive 107. Dies 102 may include a sensor die, a microcontroller die, and a HV die as described above. Other dies may be included as well. Dies 102 may optionally include conductive pillars 111 and a dielectric material 109 formed around conductive pillars 111. Notably, dies 102 are attached to carrier substrate 600 without first forming any through vias or backside RDLs.

Figure 6C:
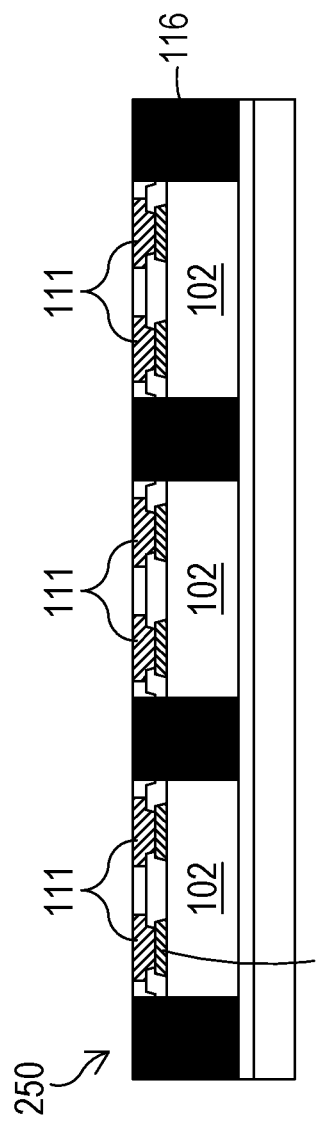

In FIG. 6C, a molding compound 116 is formed around dies 102 using a similar process as described above with respect to FIG. 5F. For example, molding compound 116 may be applied by compression molding, transfer molding, or the like. After curing, molding compound 116 can undergo a grinding process to expose through vias 118 and conductive pillars 111. Top surfaces of through vias 118, conductive pillars 111, and molding compound 116 are co-planar after the grinding process. As another example, molding compound 116 may be applied using an exposed molding process. In an embodiment exposed molding process, a mold chase having a release film (e.g., comprising PET, teflon, or other suitable material) is applied to top surfaces of dies 102, and molding compound 116 is injected around dies 102. Because a release film is applied to top surfaces of dies 102 while molding compound 116 is injected, molding compound 116 is not formed over dies 102. Thus, molding compound 116 does not need to be subsequently planarized to expose electrical connectors to dies 102. In embodiments where an exposed molding process is used, a top surface of molding compound 116 may be level with or lower than top surfaces of dies 102.

Figure 6D:
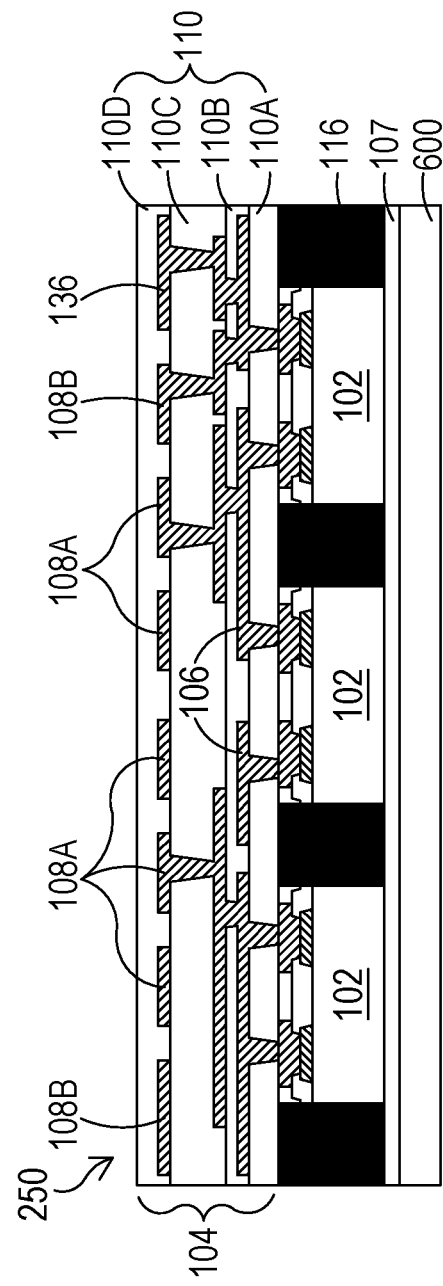

In FIG. 6D, fan-out RDLs 104 are formed over dies 102 and molding compound 116 using, for example, a similar process as those described above with respect to FIGS. 5G through 5P. Fan-out RDLs 104 include lower dielectric layers 110A and 110B having conductive features 106 disposed therein. Conductive features 106 electrically interconnect various dies 102 within device package 250. Fan-out RDLs 104 further includes upper dielectric layers 110C and 110D having an array of electrodes 108A and a finger drive ring 108B disposed therein. Conductive vias electrically connect the array of electrodes 108A and the finger drive ring 108B to conductive features 106 and dies 102.

Upper dielectric layer 110C further includes contact pads 136 to provide electrical connection to other device components. Contact pads 136 may be substantially level with the array of electrodes 108A and the finger drive ring 108B. Although FIG. 6D illustrates contact pads 136 as being disposed outside of a region encircled by finger drive ring 108B, in other embodiments, finger drive ring 108B encircles contact pads 136 (see e.g., FIG. 2A).

In FIG. 6E, a top-most dielectric layer 110D is patterned. The patterning forms openings to expose portions of contact pads 136. The patterning may be by an acceptable process, such as by exposing dielectric layer 110D to light when the dielectric layer is a photosensitive material or by etching using, for example, an anisotropic etch. If dielectric layer 110D is a photosensitive material, dielectric layer 110D can be developed after the exposure.

In FIG. 6F, connectors 126 may be disposed in the openings in dielectric layer 110D. In some embodiments, connectors 126 comprise a solder paste, a solder ball, or the like. Furthermore, a singulation process (not illustrated) may be performed along scribe line regions e.g., between adjacent device packages 100 (not illustrated). The sawing singulates package 250 from other packages (not illustrated).

Figure 6G:
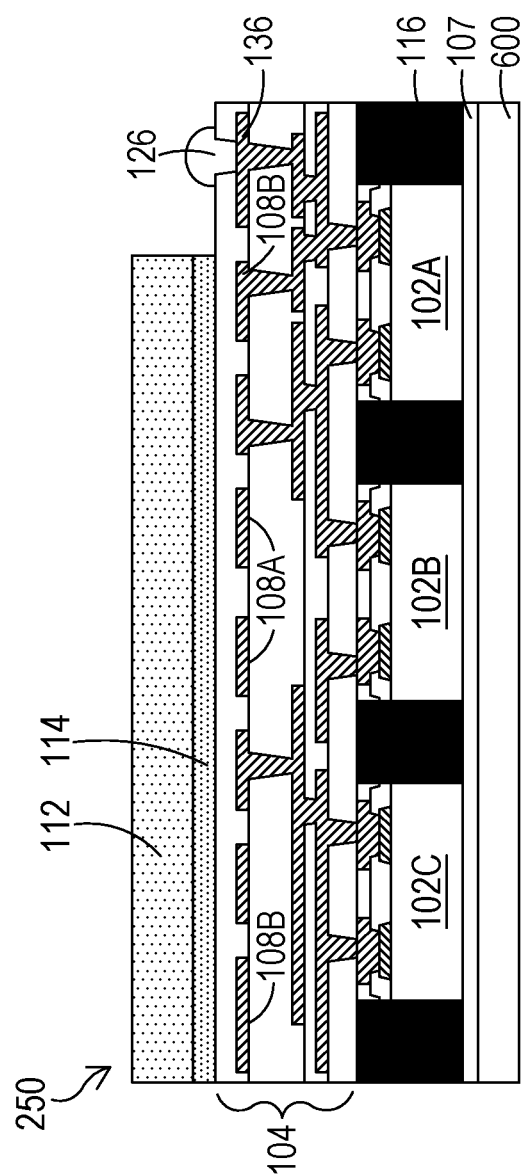

In FIG. 6G, a sensor surface material 114 (e.g., sapphire, glass, or the like) is adhered to a top surface of fan-out RDLs 104 (e.g., a surface of fan-out RDLs 104 opposing dies 102) with the assistance of a glue layer 112. In an embodiment the glue layer 112 is a color film or adhesive glue, such as an epoxy resin, a phenol resin, acrylic rubber, silica filler, or a combination thereof. However, any other suitable material may be utilized. Thus, an InFO finger print device package 250 may be completed having an array of electrodes 108A and a finger drive ring 108B in fan-out RDLs 104. In subsequent process steps, bonding wires may be used to electrically connect other package components to connectors 126 (see FIG. 2B).

Thus as described above, an embodiment fingerprint sensor device package includes a sensor die and an array of electrodes formed in fan-out RDLs disposed over the sensor die. An embodiment package may further include additional dies, and the array of electrodes may also extend over the other dies. In some embodiments, a finger drive ring encircles the array of electrodes so that an active capacitance approach can be used to determine the contours of a finger applied to the fingerprint sensor device package. Various embodiments can achieve one or more of the following non-limiting advantages: improved sensitivity due to reduced spacing between an applied finger the sensor pixel array (e.g., the array of electrodes); lower manufacturing cost and/or smaller form factor due to chip size reduction of control circuitry, cost reduction of the finger drive ring due to integration within fan-out RDLs, enhance sensitivity using an RF signal approach to fingerprint detection, increased sensitivity due to HV chip integration, and increased security level due to a microcontroller die integrated in the sensor module.

In accordance with an embodiment, a device package includes a sensor die, one or more additional dies adjacent the sensor die, and a molding compound encircling the sensor die and the one or more additional dies. The device package further includes redistribution layers over the sensor die, the one or more additional dies, and the molding compound. The redistribution layers include first conductive features in a first dielectric layer. The first conductive features electrically connect the sensor die to the one or more additional dies. The redistribution layers further include an array of electrodes in a second dielectric layer over the first dielectric layer and electrically connected to the sensor die.

In accordance with another embodiment, a device package includes a sensor die, a molding compound extending along sidewalls of the sensor die, and a first dielectric layer over the sensor die and the molding compound. The device package further includes an array of electrodes in the first dielectric layer and electrically connected to the sensor die. The array of electrodes extends laterally past the sensor die. The device package further includes a finger drive ring in the first dielectric layer and encircling the array of electrodes. The finger drive ring is electrically connected to the sensor die.

In accordance with yet another embodiment, a method for forming a device package includes encapsulating a sensor die and one or more additional dies in a molding compound, depositing a first dielectric layer over the molding compound, the sensor die, and the one or more additional dies, and forming conductive features in the first dielectric layer. The conductive features electrically connect the sensor die to the one or more additional dies. The method further includes depositing a second dielectric layer over the first dielectric layer and the conductive features and forming an array of electrodes over the second dielectric layer. The array of electrodes is electrically connected to the sensor die. The method further includes depositing a third dielectric layer over the array of electrodes and attaching a sensor surface material to the third dielectric layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device package comprising:
a plurality of dies, wherein a first die of the plurality of dies is a sensor die;
an encapsulant extending along sidewalls of the plurality of dies;
one or more first dielectric layers and one or more first conductive layers over the first die, wherein the one or more first conductive layers electrically couple at least two of the plurality of dies; and
a second dielectric layer and a second conductive layer over the one or more first dielectric layers, wherein the one or more first dielectric layers is interposed between the second dielectric layer and the plurality of dies, the second dielectric layer comprising fingerprint sensor electrodes, wherein the fingerprint sensor electrodes overlap at least two of the plurality of dies, wherein the second conductive layer comprises a drive ring, wherein the drive ring comprises a first continuous conductive feature encircling the fingerprint sensor electrodes in a plan view, wherein the drive ring comprises a second continuous conductive feature encircling the fingerprint sensor electrodes in the plan view.

2. The device package of claim 1 further comprising a through via extending through the encapsulant.

3. The device package of claim 1, wherein the drive ring comprises intermediate conductive features electrically coupling the first continuous conductive feature to the second continuous conductive feature.

4. The device package of claim 1, wherein contact pads of the sensor die faces the one or more first dielectric layers.

5. A device package comprising:
a first die and a second die, wherein the first die is a sensor die;
an encapsulant extending along sidewalls of the first die and the second die;
one or more first conductive layers in one or more first dielectric layers, the one or more first dielectric layers extending over the first die and the encapsulant, wherein the one or more first conductive layers electrically couple at least two of the plurality of dies; and
a second dielectric layer and a second conductive layer over the one or more first dielectric layers, wherein the second conductive layer comprises:
a plurality of fingerprint sensor electrodes; and
a fingerprint drive ring interposed between the plurality of fingerprint sensor electrodes and a lateral edge of the device package in a plan view, wherein at least a portion of the fingerprint drive ring is interposed between adjacent ones of the plurality of fingerprint sensor electrodes in the plan view.

6. The device package of claim 5, wherein the fingerprint drive ring is entirely over the encapsulant in a plan view and does not overlap the first die, the second die, or an additional die.

7. The device package of claim 5, wherein the second conductive layer further comprises
a wirebond contact pad;
a wire; and
a solder joint electrically coupling the wire to the wirebond contact pad.

8. The device package of claim 5 further comprising:
one or more third conductive layers in one or more third dielectric layers, wherein the first die and the second die are interposed between the one or more first dielectric layers and the one or more third dielectric layers; and
through vias electrically coupling conductive features of the one or more first conductive layers to corresponding conductive features of the one or more third conductive layers.

9. A device package comprising:
a first die and a second die, wherein the first die is a sensor die, the first die having contact pads on a first side;
an encapsulant extending along sidewalls of the first die and the second die;
a first dielectric layer over the first die and the encapsulant;
a first conductive layer over the first dielectric layer, the first conductive layer comprising first conductive features extending through the first dielectric layer to select ones of the contact pads, one or more conductive features of the first conductive layer being electrically interposed between the first die and the second die;
a second dielectric layer over the first dielectric layer;
a second conductive layer over the second dielectric layer, the second conductive layer comprising:
a plurality of fingerprint sensor electrodes electrically coupled to the first die; and
a fingerprint drive ring electrically coupled to the first die, the fingerprint drive ring completely encircling the first die in a plan view, wherein the fingerprint drive ring comprises:
an outer drive ring;
an inner drive ring; and
intermediate sections electrically coupling the outer drive ring to the inner drive ring.

10. The device package of claim 9, wherein the fingerprint drive ring completely encircles the second die in the plan view.

11. The device package of claim 9, wherein the second conductive layer further comprises:
a bond contact pad; and
a wire bonded to the bond contact pad by a conductive material, wherein the fingerprint drive ring is interposed between the bond contact pad and the plurality of fingerprint sensor electrodes in the plan view.

12. The device package of claim 9, wherein the second conductive layer further comprises:
a bond contact pad; and
a wire bonded to the bond contact pad by a conductive material, wherein the fingerprint drive ring encircles the bond contact pad and the plurality of fingerprint sensor electrodes in the plan view.

13. The device package of claim 9, wherein the fingerprint drive ring comprises a cross-shaped section, wherein the cross-shaped section is interposed between adjacent ones of the plurality of fingerprint sensor electrodes in the plan view.

14. The device package of claim 1, wherein the fingerprint sensor electrodes comprises a first fingerprint sensor electrode and a second fingerprint sensor electrode, wherein the drive ring comprises a first segment interposed between the first fingerprint sensor electrode and the second fingerprint sensor electrode in the plan view.

15. The device package of claim 5, wherein the fingerprint drive ring comprises a first drive ring encircling a second drive ring in the plan view.

16. A device package comprising:
a plurality of dies, wherein a first die of the plurality of dies is a sensor die;
an encapsulant extending along sidewalls of the plurality of dies;
one or more first dielectric layers and one or more first conductive layers over the first die, wherein the one or more first conductive layers electrically couple at least two of the plurality of dies; and
a second dielectric layer and a second conductive layer over the one or more first dielectric layers, wherein the one or more first dielectric layers is interposed between the second dielectric layer and the plurality of dies, the second dielectric layer comprising fingerprint sensor electrodes, wherein the fingerprint sensor electrodes overlap at least two of the plurality of dies, wherein the second conductive layer comprises a drive ring, wherein the drive ring comprises a first continuous conductive feature encircling the fingerprint sensor electrodes in a plan view, wherein the drive ring comprises a second segmented conductive feature encircling the fingerprint sensor electrodes in the plan view.

17. The device package of claim 16, wherein the drive ring comprises intermediate conductive features electrically coupling the first continuous conductive feature to the second segmented conductive feature.

18. A device package comprising:
a first die and a second die, wherein the first die is a sensor die, the first die having contact pads on a first side;
an encapsulant extending along sidewalls of the first die and the second die;
a first dielectric layer over the first die and the encapsulant;
a first conductive layer over the first dielectric layer, the first conductive layer comprising first conductive features extending through the first dielectric layer to select ones of the contact pads, one or more conductive features of the first conductive layer being electrically interposed between the first die and the second die;
a second dielectric layer over the first dielectric layer; and
a second conductive layer over the second dielectric layer, the second conductive layer comprising:
a plurality of fingerprint sensor electrodes electrically coupled to the first die;
a fingerprint drive ring electrically coupled to the first die, the fingerprint drive ring completely encircling the first die in a plan view;
a bond contact pad; and
a wire bonded to the bond contact pad by a conductive material, wherein the fingerprint drive ring is interposed between the bond contact pad and the plurality of fingerprint sensor electrodes in the plan view.

19. A device package comprising:
a first die and a second die, wherein the first die is a sensor die, the first die having contact pads on a first side;
an encapsulant extending along sidewalls of the first die and the second die;
a first dielectric layer over the first die and the encapsulant;
a first conductive layer over the first dielectric layer, the first conductive layer comprising first conductive features extending through the first dielectric layer to select ones of the contact pads, one or more conductive features of the first conductive layer being electrically interposed between the first die and the second die;
a second dielectric layer over the first dielectric layer;
a second conductive layer over the second dielectric layer, the second conductive layer comprising:
a plurality of fingerprint sensor electrodes electrically coupled to the first die;
a fingerprint drive ring electrically coupled to the first die, the fingerprint drive ring completely encircling the first die in a plan view;
a bond contact pad; and
a wire bonded to the bond contact pad by a conductive material, wherein the fingerprint drive ring encircles the bond contact pad and the plurality of fingerprint sensor electrodes in the plan view.

* * * * *